United States Patent
Beniyama et al.

(10) Patent No.: US 8,022,812 B2
(45) Date of Patent: Sep. 20, 2011

(54) INFORMATION COLLECTION SYSTEM AND INFORMATION COLLECTION ROBOT

(75) Inventors: Fumiko Beniyama, Yokohama (JP); Toshio Moriya, Tokyo (JP); Kosei Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 770 days.

(21) Appl. No.: 12/132,034

(22) Filed: Jun. 3, 2008

(65) Prior Publication Data

US 2009/0021351 A1 Jan. 22, 2009

(30) Foreign Application Priority Data

Jul. 17, 2007 (JP) .................. 2007-185449

(51) Int. Cl.
*H04Q 5/22* (2006.01)

(52) U.S. Cl. ............ 340/10.1; 340/995.1; 340/996; 340/539.13; 340/572.1; 901/1; 700/245; 700/264; 235/375; 235/385; 701/200; 701/226

(58) Field of Classification Search .... 340/572.1–572.9, 340/10.1–10.6, 995.1–996, 539.13; 701/200–226; 235/375–385; 901/1
See application file for complete search history.

(56) References Cited

U.S. PATENT DOCUMENTS

| | | | | |
|---|---|---|---|---|
| 5,172,147 A * | 12/1992 | Rockhill | ..................... | 396/428 |
| 5,413,454 A * | 5/1995 | Movsesian | ..................... | 414/729 |
| 6,195,006 B1 * | 2/2001 | Bowers et al. | ............. | 340/572.1 |
| 6,496,806 B1 * | 12/2002 | Horwitz et al. | ................. | 705/28 |
| 6,917,854 B2 * | 7/2005 | Bayer | ......................... | 700/245 |
| 7,187,998 B2 * | 3/2007 | Okamoto et al. | ............. | 700/245 |
| 7,209,803 B2 * | 4/2007 | Okamoto et al. | ............. | 700/245 |
| 7,269,479 B2 * | 9/2007 | Okamoto et al. | ............. | 700/245 |
| 7,272,945 B2 * | 9/2007 | Bash et al. | ...................... | 62/180 |
| 7,499,893 B2 * | 3/2009 | Czora | .......................... | 706/18 |
| 7,515,990 B2 * | 4/2009 | Sato et al. | .................... | 700/245 |
| 7,630,164 B2 * | 12/2009 | Sasaki | ....................... | 360/92.1 |
| 7,693,757 B2 * | 4/2010 | Zimmerman | .................... | 705/28 |
| 2004/0040086 A1 * | 3/2004 | Eisenberg et al. | ............ | 5/81.1 R |
| 2004/0098167 A1 * | 5/2004 | Yi et al. | ........................ | 700/245 |
| 2004/0167667 A1 * | 8/2004 | Goncalves et al. | ............ | 700/245 |
| 2005/0075756 A1 * | 4/2005 | Itabashi | ...................... | 700/245 |
| 2005/0230470 A1 * | 10/2005 | Hoshino | ....................... | 235/375 |
| 2006/0047361 A1 * | 3/2006 | Sato et al. | ..................... | 700/245 |
| 2006/0055530 A1 * | 3/2006 | Wang et al. | ............. | 340/539.13 |
| 2006/0058921 A1 * | 3/2006 | Okamoto | ...................... | 700/255 |

(Continued)

FOREIGN PATENT DOCUMENTS

JP 2003-241833 8/2003

(Continued)

*Primary Examiner* — Benjamin C Lee
*Assistant Examiner* — Quang D Pham
(74) *Attorney, Agent, or Firm* — Antonelli, Terry, Stout & Kraus, LLP.

(57) ABSTRACT

An information collection system is provided, which can automatically calculate an operation or a travel path of a tag reader for collecting information of an RF tag. The information collection system of the present invention moves, in a movable area of a two-dimensional map, the tag reader along a surface of an object by referring to a three-dimensional map to emit radio waves while moving an information collection robot, records, upon reception of tag ID from the RF tag, a position of the information collection robot at the time as a data acquisition position, and calculates a path passing through data acquisition positions of all the recorded data as a moving sequence in a movable area of the information collection robot.

10 Claims, 27 Drawing Sheets

INFORMATION COLLECTION SYSTEM 10

U.S. PATENT DOCUMENTS

| | | | |
|---|---|---|---|
| 2006/0111811 A1* | 5/2006 | Okamoto et al. | 700/214 |
| 2006/0111812 A1* | 5/2006 | Okamoto et al. | 700/214 |
| 2006/0112034 A1* | 5/2006 | Okamoto et al. | 706/16 |
| 2006/0116973 A1* | 6/2006 | Okamoto et al. | 706/16 |
| 2006/0184279 A1* | 8/2006 | Okamoto et al. | 700/245 |
| 2007/0027579 A1* | 2/2007 | Suzuki et al. | 700/245 |
| 2007/0050131 A1* | 3/2007 | Masuda | 701/209 |
| 2007/0061041 A1* | 3/2007 | Zweig | 700/245 |
| 2007/0100498 A1* | 5/2007 | Matsumoto et al. | 700/245 |
| 2007/0124024 A1* | 5/2007 | Okamoto et al. | 700/245 |
| 2007/0188328 A1 | 8/2007 | Mochizuki et al. | |
| 2007/0271003 A1* | 11/2007 | Bang et al. | 700/245 |
| 2007/0282484 A1* | 12/2007 | Chung et al. | 700/245 |
| 2008/0077511 A1* | 3/2008 | Zimmerman | 705/28 |
| 2008/0306787 A1* | 12/2008 | Hamilton et al. | 705/7 |
| 2009/0012667 A1* | 1/2009 | Matsumoto et al. | 701/26 |
| 2009/0177323 A1* | 7/2009 | Ziegler et al. | 700/259 |
| 2009/0198376 A1* | 8/2009 | Friedman et al. | 700/248 |
| 2011/0010083 A1* | 1/2011 | Lee et al. | 701/200 |

FOREIGN PATENT DOCUMENTS

| | | |
|---|---|---|
| JP | 2005-320074 | 11/2005 |
| JP | 2007-122304 | 5/2007 |
| JP | 2007-221304 | 8/2007 |

* cited by examiner

FIG. 7

TAG READER CHARACTERISTIC STORAGE UNIT 306

| RADIO WAVE INTENSITY | EMISSION-FEASIBLE AREA |
|---|---|
| 1 | $\{(x_{11},y_{11},z_{11}),(x_{12},y_{12},z_{12}),(x_{13},y_{13},z_{13})\},\{(x_{21},y_{21},z_{21}),(x_{22},y_{22},z_{22}),(x_{23},y_{23},z_{23})\},\ldots$ |
| 2 | $\{(x_{11},y_{11},z_{11}),(x_{12},y_{12},z_{12}),(x_{13},y_{13},z_{13})\},\{(x_{21},y_{21},z_{21}),(x_{22},y_{22},z_{22}),(x_{23},y_{23},z_{23})\},\ldots$ |
| ... | ... |

MOVING SEQUENCE STORAGE UNIT 312

| SEQUENCE | DATA ACQUISITION POSITION | TAG INFORMATION | |
| --- | --- | --- | --- |
| | | TAG ID | TAG POSITION |
| 1 | $(X_1, Y_1)$ | 0x00000001 | $(x_1, y_1, z_1)$ |
| 2 | $(X_2, Y_2)$ | 0x00000003 | $(x_2, y_2, z_2)$ |
| 3 | $(X_3, Y_3)$ | 0x0000000a | $(x_3, y_3, z_3)$ |
| ... | ... | ... | ... |

3120  3121  3122  3123  3124

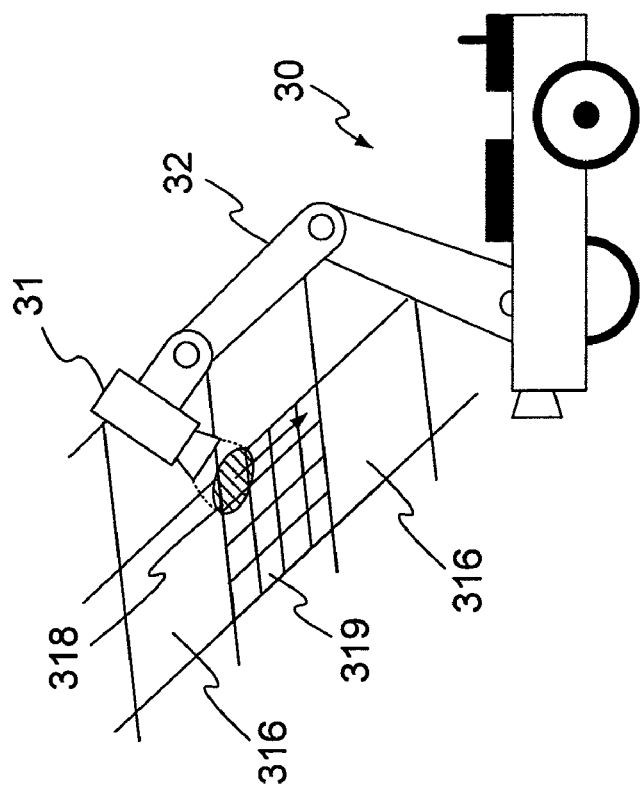
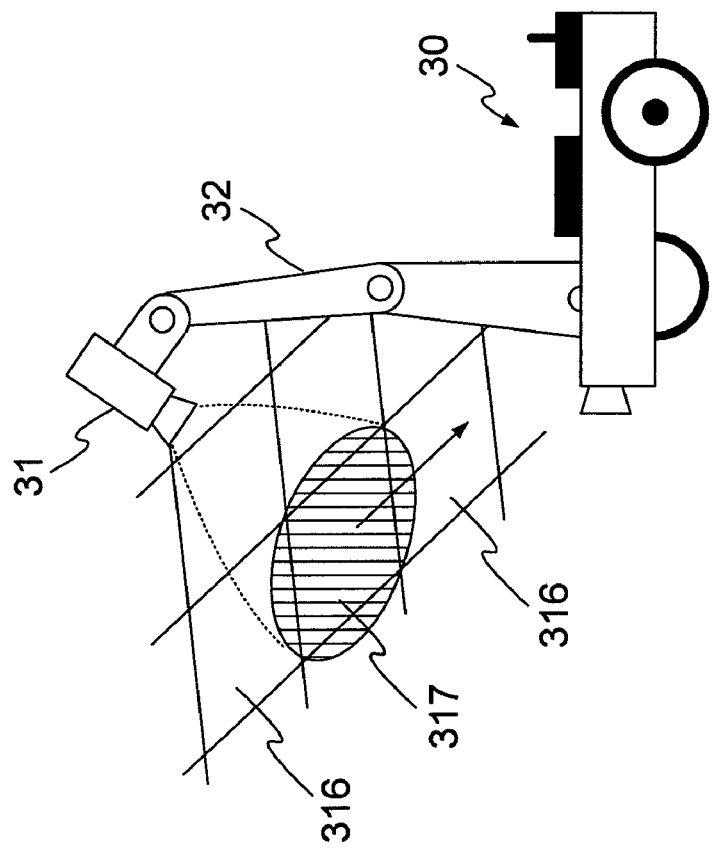
FIG. 12A
FIG. 12B

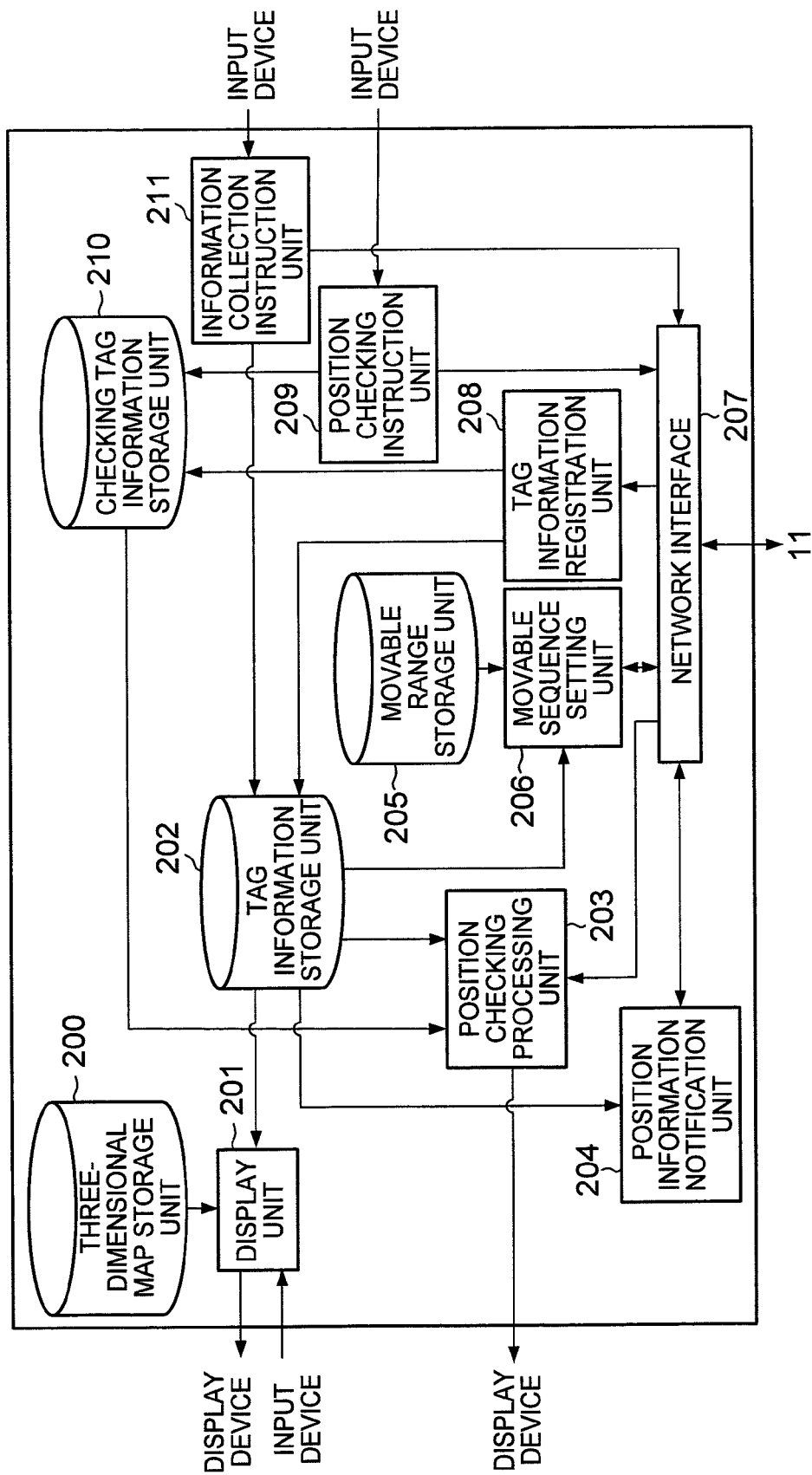

FIG. 14

TAG INFORMATION STORAGE UNIT 202

| TAG ID 2020 | TAG THREE-DIMENSIONAL POSITION 2021 | DATA ACQUISITION POSITION 2022 | COLLECTION DATE AND TIME 2023 | OTHER INFORMATION 2024 |
|---|---|---|---|---|
| 0x00000001 | $(x_1, y_1, z_1)$ | $(X_1, Y_1)$ | 2006/11/20 4:25:31 | *** |
| 0x00000002 | $(x_2, y_2, z_2)$ | $(X_2, Y_2)$ | 2006/11/20 4:26:48 | *** |
| 0x00000003 | $(x_3, y_3, z_3)$ | $(X_3, Y_3)$ | 2006/11/20 4:28:07 | *** |
| ... | ... | ... | ... | ... |

FIG. 16

CHECKING TAG INFORMATION STORAGE UNIT 210

| DESIGNATED AREA 2100 | TAG ID 2101 | TAG THREE-DIMENSIONAL POSITION 2102 | CHECKING DATE AND TIME 2103 | OTHER INFORMATION 2104 |
|---|---|---|---|---|
| (a,b,c) | 0x00000001 | $(x_1, y_1, z_1)$ | 2006/11/20 4:25:31 | *** |
| (d,e,f) | 0x00000003 | $(x_2, y_2, z_2)$ | 2006/11/20 4:26:48 | *** |
| (g,h,i) | 0x0000000a | $(x_3, y_3, z_3)$ | 2006/11/20 4:28:07 | *** |
| ... | ... | ... | ... | ... |

FIG. 19

| TAG ID | COORDINATES AT TIME OF COLLECTION | COLLECTION DATE AND TIME | COORDINATES AT TIME OF CHECKING | CHECKING DATE AND TIME | OTHER INFORMATION |
|---|---|---|---|---|---|
| 0x00000001 | $(x_{11}, y_{11}, z_{11})$ | 2006/11/21 4:15:31 | $(x_{12}, y_{12}, z_{12})$ | 2006/12/20 2:25:31 | *** |
| 0x00000003 | $(x_{21}, y_{21}, z_{21})$ | 2006/11/10 3:26:48 | $(x_{22}, y_{22}, z_{22})$ | 2006/12/20 2:26:48 | *** |
| 0x00000004 | $(x_{31}, y_{31}, z_{31})$ | 2006/11/21 4:18:07 | — | — | *** |
| 0x00000008 | $(x_{41}, y_{41}, z_{41})$ | 2006/11/21 4:25:51 | $(x_{42}, y_{42}, z_{42})$ | 2006/12/20 2:28:51 | *** |
| 0x0000000a | — | — | $(x_{52}, y_{52}, z_{52})$ | 2006/12/20 2:31:12 | *** |
| 0x0000000c | $(x_{61}, y_{61}, z_{61})$ | 2006/11/21 4:28:47 | $(x_{62}, y_{62}, z_{62})$ | 2006/12/20 2:45:05 | *** |

OPERATION FLOW OF MANAGEMENT SERVER 20 (1)

INFORMATION COLLECTION SYSTEM AND INFORMATION COLLECTION ROBOT

BACKGROUND OF THE INVENTION

The present invention relates to a technology of automatically collecting information of an ID tag.

A radio frequency-identification (RFID) system is known in which an ID tag containing information regarding an article is attached to the article, and the information is obtained wirelessly from the ID tag to carry out management. In such an RFID system, information in the ID tag can be obtained even from a remote position by a sensor such as a tag reader. As a technology which uses this characteristic, for example, Japanese Patent Laid-open Publication No. 2005-320074 (hereinafter, referred to as Patent Document 1) discloses a technology which uses a mobile robot in which a tag reader is installed, and collects information of an ID tag and a position of the ID tag, from which the information has been obtained, by using the tag reader, which has narrow directionality, and changing radio wave intensity, thereby collecting position information of an article to which the ID tag is attached.

SUMMARY OF THE INVENTION

Shelf arrangement of a warehouse where articles are stored is sometimes changed. The change in shelf arrangement may inhibit passage through a place which has permitted passage up to now. In the technology disclosed in Patent Document 1, there is no specific description of a travel path of the mobile robot, and it is presumed that a travel path may be set beforehand by a user. Thus, if the shelf arrangement is changed in the warehouse, the travel path of the mobile robot has to be set all over again. If the shelf arrangement of the warehouse is intricate, it takes time and labor to calculate and set the travel path. If metal or moisture is present in front of the ID tag, blocking radio waves, information of the ID tag cannot be obtained.

The present invention has been made with the above-mentioned situation in mind, and it is an object of the present invention to automatically calculate a travel path for collecting information of an ID tag, and to reduce failed acquisition of the ID tag information as much as possible.

To solve the abovementioned problem, according to the present invention, in a movable area of a two-dimensional map, a sensor is moved by referring to a three-dimensional map to execute sensing along a surface of an object while moving an information collection robot. Upon reception of tag ID from an ID tag, position of the information collection robot at the time is recorded as a data acquisition position, and a moving sequence is set in which a passing order corresponds to each data acquisition position of all the recorded data in the movable area of the information collection robot.

For example, a first aspect of the present invention provides an information collection system, including:

an information collection robot which automatically collects information indicating a position of an ID tag which stores a tag ID to identify the ID tag; and a management server which manages the information collected by the information collection robot, in which:

the information collection robot includes:

a first three-dimensional map storage unit which stores a three-dimensional map which is a set of surface coordinates of a three-dimensional environment;

a two-dimensional map storage unit which stores a two-dimensional map which is a set of three-dimensional coordinates at a predetermined height in the three-dimensional map;

a first movable range storage unit which stores a movable range which is information indicating a movable area of the information collection robot in the two-dimensional map;

a moving unit which moves the information collection robot;

a sensor which reads the tag ID stored in the ID tag attached to an object in a room;

a sensor characteristic storage unit which stores a measurable area indicating a three-dimensional area measurable by the sensor;

a localization unit which estimates coordinates of the information collection robot in the two-dimensional map;

a tag information collection unit which moves, upon reception of an information collection instruction to collect ID tag information from the management server, the information collection robot within the movable range in the two-dimensional map by using the moving unit, moves the sensor while measuring along an object surface shown in the three-dimensional map by using the sensor at a moving destination, specifies a surface area of the three-dimensional map measurable by the sensor based on a data acquisition position indicated by coordinates of the information collection robot when the tag ID is obtained from the ID tag, the measurable area stored in the sensor characteristic storage unit, an orientation of the sensor, and the three-dimensional map, and transmits first tag information containing coordinates in the specified surface area, the data acquisition position, and the obtained tag ID to the management server;

a moving sequence storage unit which stores a moving sequence where via-positions as coordinates to be passed through by the information collection robot in the movable range and as coordinates at which coordinates of the ID tag and the tag ID are to be collected by using the sensor are correlated with information indicating a passing sequence of the information collection robot; and a moving sequence reception unit which stores, upon reception of the moving sequence from the management server, the received moving sequence in the moving sequence storage unit; and the management server includes:

a tag information storage unit which stores, in association with the tag ID, coordinates of the ID tag corresponding to the tag ID and the data acquisition position of the information collection robot when the tag ID is obtained;

a second movable range storage unit which stores the movable range;

an information collection instruction unit which transmits the information collection instruction to the information collection robot according to a request from a user;

a tag information registration unit which stores, upon reception of the first tag information from the information collection robot, the received first tag information in the tag information storage unit; and a moving sequence setting unit which refers to the tag information storage unit and the second movable range storage unit to set data acquisition positions as the via-positions, and generates a moving sequence where the passing sequence is correlated with the via-positions, and transmits the generated moving sequence to the information collection robot.

Further, a second aspect of the present invention provides an information collection robot which automatically collects information indicating a position of an ID tag which stores a tag ID to identify the ID tag, including:

a first three-dimensional map storage unit which stores a three-dimensional map which is a set of surface coordinates of a three-dimensional environment;

a two-dimensional map storage unit which stores a two-dimensional map which is a set of three-dimensional coordinates at a predetermined height in the three-dimensional map;

a first movable range storage unit which stores a movable range which is information indicating a movable area of the information collection robot in the two-dimensional map;

a moving unit which moves the information collection robot;

a sensor which reads the tag ID stored in the ID tag attached to an object in a room;

a sensor characteristic storage unit which stores a measurable area indicating a three-dimensional area where a radio wave emitted by the sensor reaches;

a localization unit which estimates coordinates of the information collection robot in the two-dimensional map;

a tag information collection unit which moves, upon reception of an information collection instruction to collect ID tag information from the management server, the information collection robot within the movable range in the two-dimensional map by using the moving unit, senses an object surface shown in the three-dimensional map by using the sensor at a moving destination, specifies a surface area of the three-dimensional map that can be sensed by the sensor based on a data acquisition position indicated by coordinates of the information collection robot when the tag ID is obtained from the ID tag, the measurable area stored in the sensor characteristic storage unit, an orientation of the sensor, and the three-dimensional map, and transmits first tag information containing coordinates in the specified surface area, the data acquisition position, and the obtained tag ID to the management server;

a moving sequence storage unit which stores a moving sequence where via-positions as coordinates to be passed through by the information collection robot in the movable range and as coordinates at which coordinates of the ID tag and the tag ID are to be collected by using the sensor are correlated with information indicating a passing sequence of the information collection robot; and a moving sequence reception unit which stores, upon reception of the moving sequence from the management server, the received moving sequence in the moving sequence storage unit.

According to the information collection system of the present invention, a travel path for collecting information of an ID tag and operation of the sensor such as a tag reader can automatically be calculated.

BRIEF DESCRIPTION OF THE DRAWINGS

In the accompanying drawings:

FIG. 7 is a diagram showing an example of a data structure stored in a tag reader characteristic storage unit;

FIG. 9 is a diagram showing an example of a data structure stored in a moving sequence storage unit;

FIGS. 12A and 12B are conceptual diagrams each showing a process of changing an emission area on an object surface;

FIG. 13 is a block diagram showing an example of a functional configuration of a management server;

FIG. 14 is a diagram showing an example of a data structure stored in a tag information storage unit;

FIG. 16 is a diagram showing an example of a data structure stored in a checking tag information storage unit;

FIG. 19 is a diagram showing an example of display contents displayed in the display device by a position checking processing unit;

DESCRIPTION OF THE PREFERRED EMBODIMENTS

Preferred embodiments of the present invention will be described below. A method will be described as an example, in which a tag reader is used as a sensor, and an RF tag is used which transmits tag information wirelessly as an ID tag which is to be collected.

Figure 1:
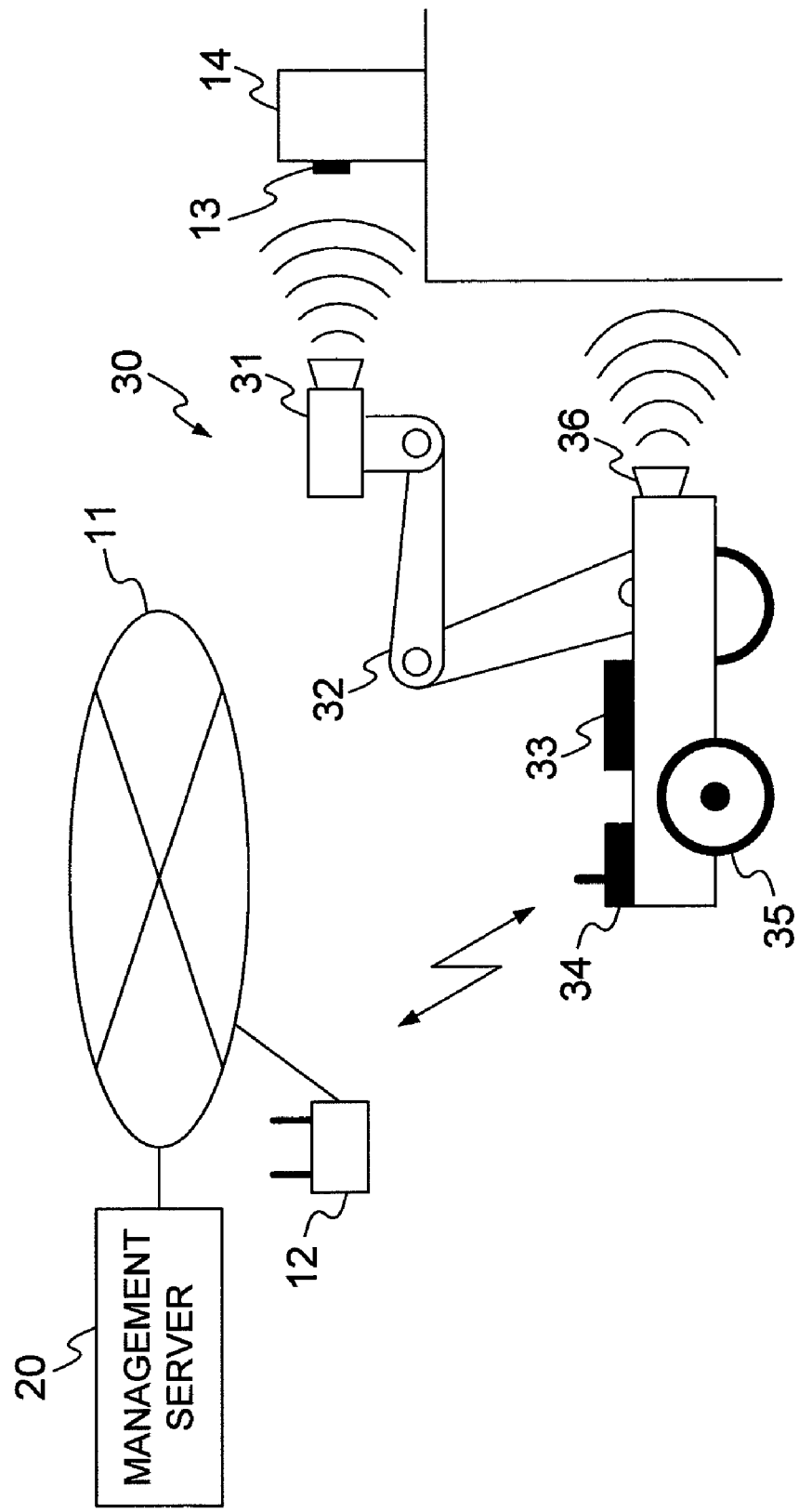
FIG. 1 is a system configuration diagram showing an example of a configuration of an information collection system according to an embodiment of the present invention.

FIG. 1 is a system configuration diagram showing an example of a configuration of an information collection system 10 according to an embodiment of the present invention.

The information collection system 10 includes a management server 20 and an information collection robot 30. The management server 20 is connected to a communication line 11 such as LAN. The information collection robot 30 communicates with a base station 12 connected to the communication line 11 by wireless communication through a communication system such as a wireless LAN, and with the management server 20 via the base station 12.

The information collection robot 30 includes a tag reader 31, an arm 32, a computer 33, a communication device 34, a moving device 35, and a range finder 36. The tag reader 31 is a sensor which obtains tag ID. The tag reader 31 emits radio waves from a directional antenna according to an instruction from the computer 33, and receives radio waves emitted from an RF tag 13 attached to an article 14 in response to the emitted radio waves, thereby obtaining read tag information from the RF tag 13 to send the tag information to the computer 33.

The moving device 35 rotates, according to an instruction from the computer 33, for example, wheels attached to the information collection robot 30 to move the information collection robot 30. As another example, the moving device 35 may travel by using a plurality of legs to move the information collection robot 30. The arm 32 controls, according to an instruction from the computer 33, an emitting direction of radio waves emitted from the tag reader 31 and a position of the tag reader 31 with respect to the article 14.

The range finder 36 measures, for example, by using laser beams, a distance and a direction from the range finder 36 to an object within a predetermined range, and sends sensing data containing information indicating the measured distance and direction to the computer 33. The communication device 34 transmits data from the computer 33 to the base station 12 through wireless communication, and receives data transmitted from the base station 12 through wireless communication to send the data to the computer 33.

The computer 33 holds a three-dimensional map which is a set of surface coordinates in a real three-dimensional environment, and a two-dimensional map at a specific height (height from a ground surface to the range finder 36) of the three-dimensional map. The computer 33 matches sensing data from the range finder 36 with the two-dimensional map to identify a position of the information collection robot 30 in the two-dimensional map, and controls the moving device 35 to move the information collection robot 30 to an object position in the three-dimensional map.

The computer 33 refers to the three-dimensional map, controls the arm 32 to move the tag reader along a surface of the object, directs radio waves emitted from the tag reader 31 to the object surface, obtains read tag information from the RF tag 13 attached to the object surface via the tag reader 31, and transmits the obtained read tag information to the management server 20 via the communication device 34.

An example of an operation in which the information collection system 10 of this embodiment is used will be described. According to this operation, first, by using the information collection robot 30, all areas in a room are thoroughly investigated taking time to collect information indicating a position of the RF tag 13. Accordingly, data indicating whereabouts of all articles in the room to which an RF tag 13 has been attached are collected, and the collected data is stored in the management server 20 (data collection step).

During work such as inventory checking or inventory taking, areas (all or some areas) of the room which become targets of the work are designated. By the information collection robot 30, the designated areas of the room are investigated to collect data indicating a position of the RF tag 13.

The collected data is compared with the first collected data by the management server 20, and a result of the comparison is used for inventory checking or taking (data checking step).

Figure 2:
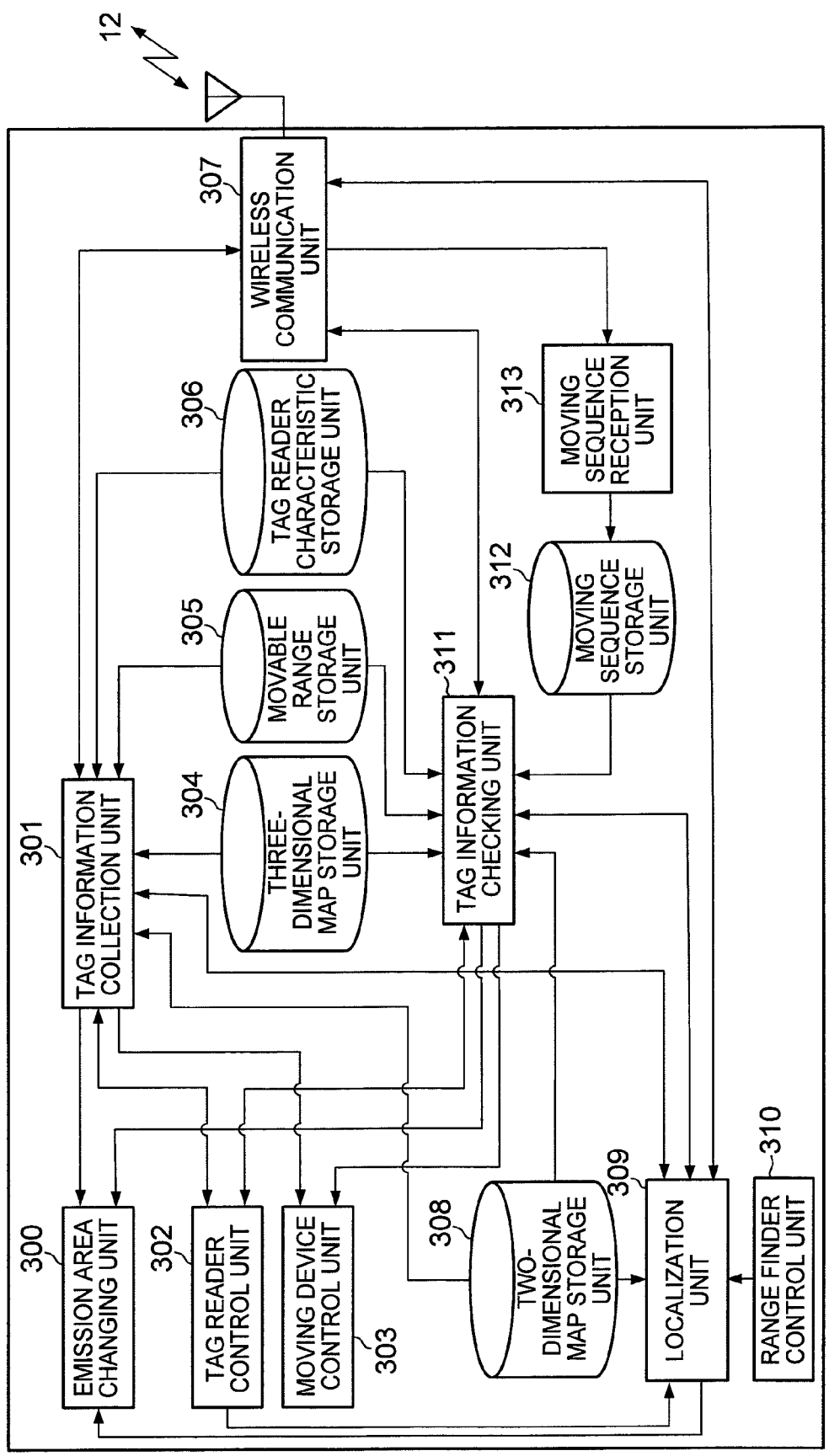
FIG. 2 is a block diagram showing an example of a functional configuration of an information collection robot.

FIG. 2 is a block diagram showing an example of a functional configuration of the information collection robot 30. The information collection robot 30 includes an emission area changing unit 300, a tag information collection unit 301, a tag reader control unit 302, a moving device control unit 303, a three-dimensional map storage unit 304, a movable range storage unit 305, a tag reader characteristic storage unit 306, a wireless communication unit 307, a two-dimensional map storage unit 308, a localization unit 309, a range finder control unit 310, a tag information checking unit 311, a moving sequence storage unit 312, and a moving sequence reception unit 313.

The wireless communication unit 307 controls the communication device 34 to communicate with the base station 12 by wireless communication through a communication system such as wireless LAN. The tag information collection unit 301, the localization unit 309, the tag information checking unit 311, and the moving sequence reception unit 313 transmit data to and from the management server 20 via the wireless communication unit 307.

The emission area changing unit 300 controls the arm 32 according to a position of the tag reader 31 and an emission direction of radio waves instructed from the tag information collection unit 301 or the tag information checking unit 311, and controls the position and the orientation of the tag reader 31. The emission area changing unit 300 controls intensity of radio waves emitted from the tag reader 31 according to radio wave intensity instructed from the tag information collection unit 301 or the tag information checking unit 311.

The tag reader control unit 302 controls the tag reader 31, obtains read tag information contained in radio waves transmitted from the RF tag 13 in the emission area of the radio waves in response to the radio waves emitted from the tag reader 31, and sends the obtained read tag information to the tag information collection unit 301, the localization unit 309, and the tag information checking unit 311. The read tag information in the RF tag 13 contains tag ID which identifies the RF tag 13 and other information. The other information includes, for example, information regarding the article 14 such as a model number of the article 14 to which the RF tag 13 has been attached.

The other information may include information indicating whether the article 14 having the RF tag 13 is an article which is unlikely to move. An article 14 which is likely to move is, for example, a commercial product. An article 14 which is unlikely to move is, for example, an article such as a shelf or a partition for arranging commercial products.

Figure 3:
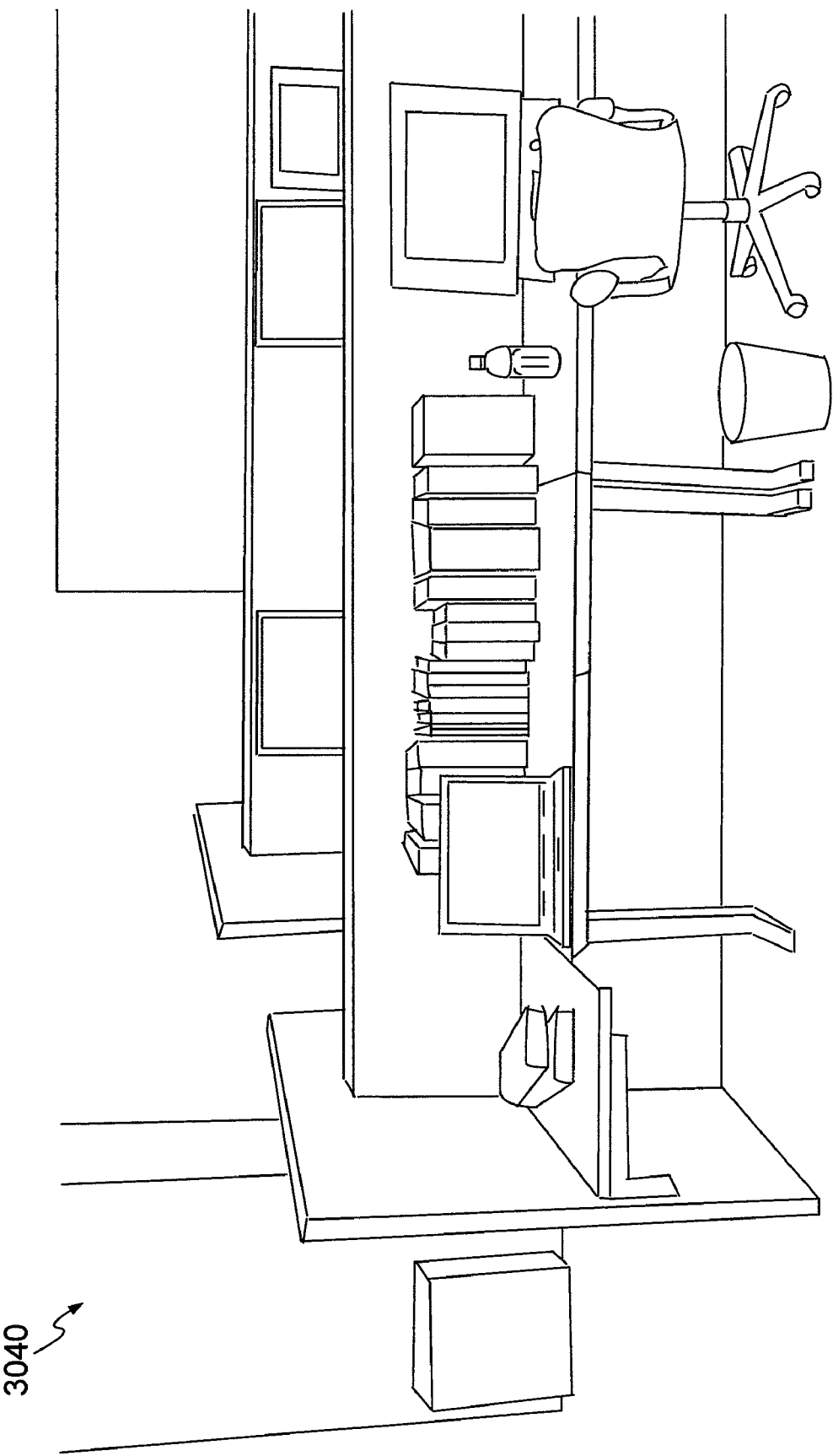
FIG. 3 is a conceptual diagram showing an example of a three-dimensional map stored in a three-dimensional map storage unit.

The three-dimensional map storage unit 304 stores a three-dimensional map indicating a set of surface coordinates in a real three-dimensional environment. The three-dimensional map is represented by, for example, a plurality of polygons, and information concerning a vertex coordinate of each polygon is stored as a three-dimensional map in the three-dimensional map storage unit 304. The three-dimensional map 3040 stored in the three-dimensional map storage unit 304 is, for example, as shown in FIG. 3. The three-dimensional map 3040 is created beforehand by a manager or the like and is registered in the three-dimensional map storage unit 304. The three-dimensional map may be created by scanning, through the information collection robot 30 that has a configuration in which the tag reader 31 has been changed to a laser sensor, a three-dimensional object surface with a laser beam to collect information indicating the shape of the three-dimensional surface, and combining the collected information.

Figure 4:
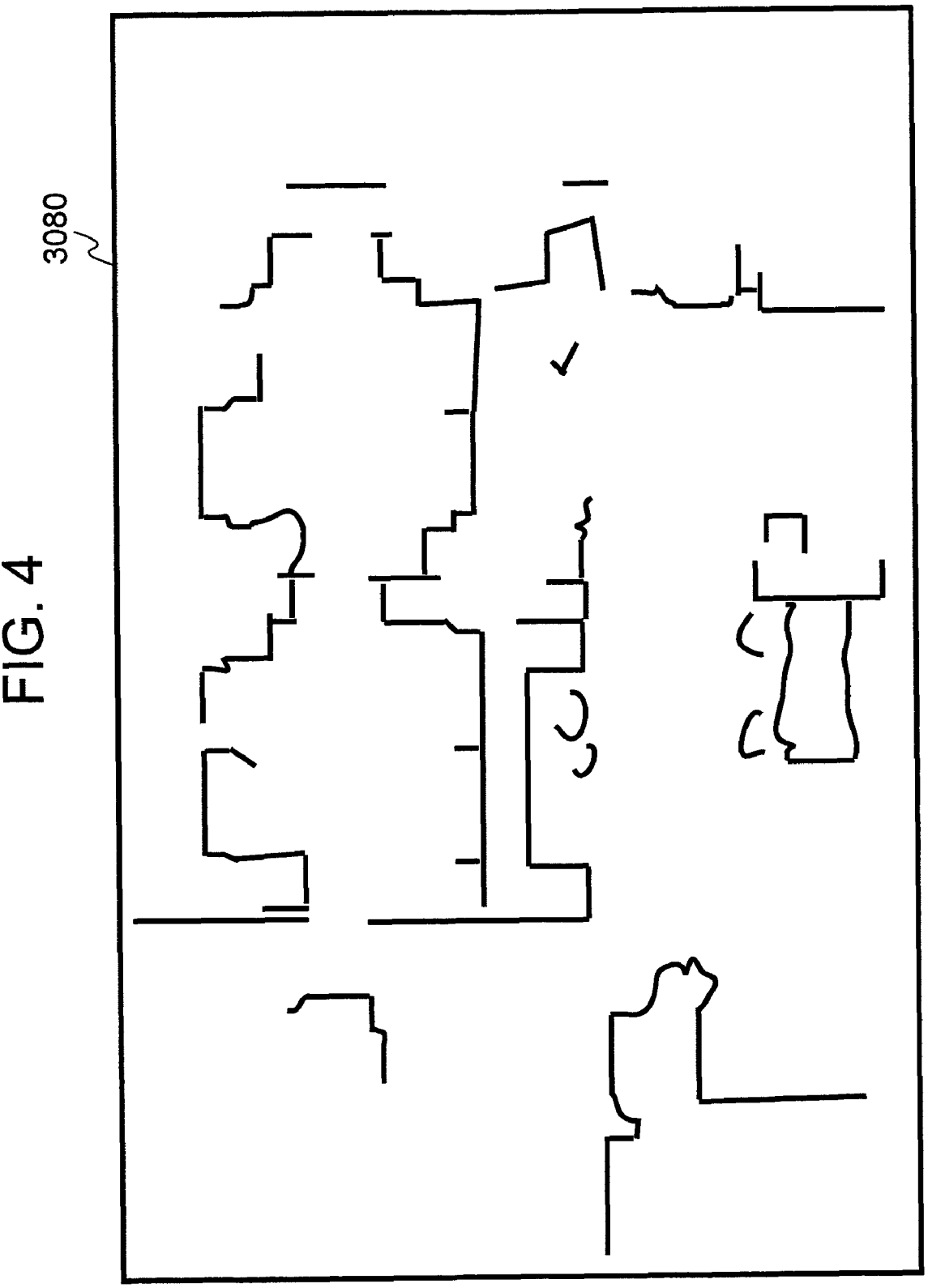
FIG. 4 is a conceptual diagram showing an example of a two-dimensional map stored in a two-dimensional map storage unit.

The two-dimensional map storage unit 308 stores a two-dimensional map at a specific height of the three-dimensional map. The two-dimensional map is, for example, two-dimensional image data, data including a plurality of line segments, or data including a set of a plurality of points. The two-dimensional map 3080 stored in the two-dimensional map storage unit 308 is, for example, as shown in FIG. 4. The two-dimensional map 3080 is created beforehand by the manager or the like, and is registered in the two-dimensional map storage unit 308.

The range finder control unit 310 controls the range finder 36 to measure a distance to an object in each direction while changing orientation of the range finder 36 by predetermined angles in left and right directions in a horizontal plane, and sends sensing data containing information indicating orientation of the range finder 36 with respect to an advancing direction of the information collection robot 30, and distance information measured by the range finder 36, to the localization unit 309.

Figure 5B:
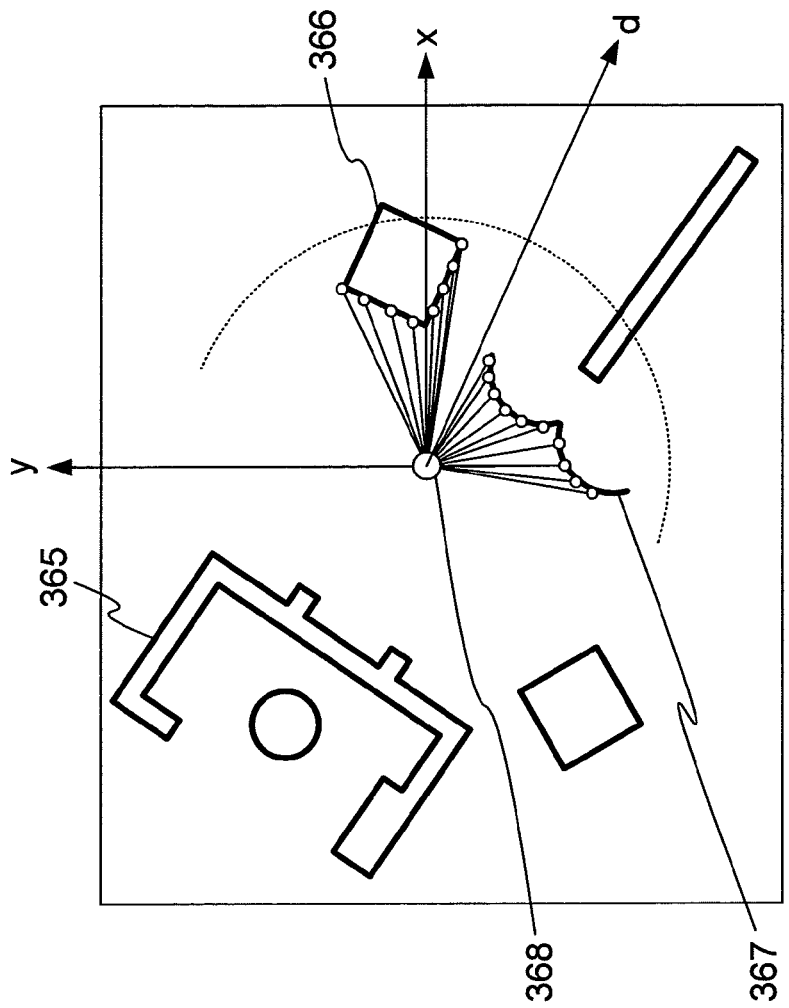
FIGS. 5A and 5B are conceptual diagrams each showing a process of identifying self position.
Figure 5A:
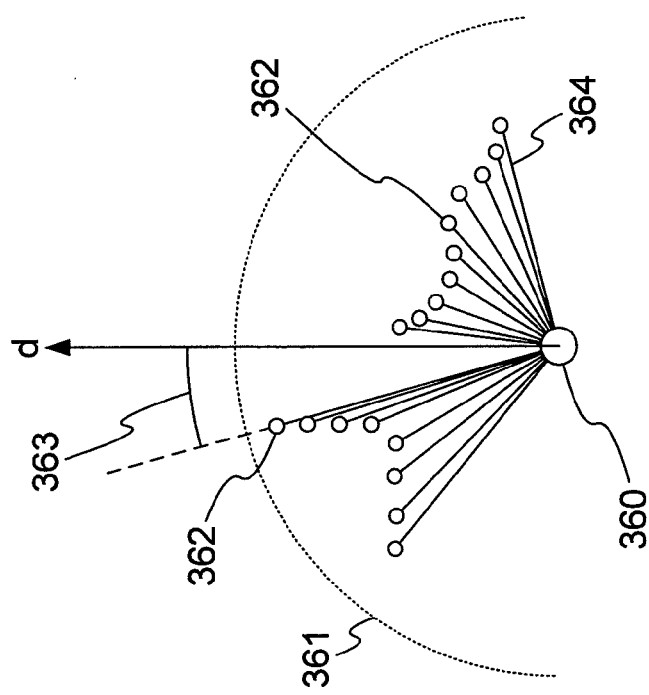

When a center 360 of the range finder 36 and an advancing direction d of the information collection robot 30 are set as references, sensing data is, for example, as shown in FIG. 5A. A measuring point 362 is a point of measuring a distance on a surface of a real environment at a height from the ground surface of the range finder 36. Information indicating an angle 363 and a distance 364 corresponds to each measuring point 362. A sensing area 361 indicates a range in which distance is measurable from the center 360 of the range finder 36.

When instructed by the tag information collation unit 301 to identify a position of the information collection robot 30 in the two-dimensional map, the localization unit 309 receives sensing data from the range finder control unit 310. The localization unit 309 refers to the two-dimensional map storage unit 308 to retrieve an array of objects in the two-dimensional map similar to an array of the sensing data received from the range finder control unit 310, while changing, in the two-dimensional map, the position of the center 360 of the range finder 36 and the advancing direction d of the information collection robot 30 with respect to the two-dimensional map.

For example, as shown in FIG. 5B, when an array of objects in the two-dimensional map similar to that of the sensing data received from the range finder control unit 310 is found, the localization unit 309 identifies a position 368 of FIG. 5B as a position of the information collection robot 30 in the two-dimensional map, and sends the identified position information of the information collection robot 30 to the tag information collection unit 301.

When instructed by the tag information checking unit 311 to identify a position of the information collection robot 30 in the two-dimensional map, the localization unit 309 instructs the emission area changing unit 300 to emit radio waves from the tag reader 31 to the surroundings of the information collection robot 30, and judges whether read tag information has been received from the tag reader control unit 302. Upon judgment that the read tag information has been received from the tag reader control unit 302, the localization unit 309 judges whether the read tag information contains information indicating an RF tag 13 attached to an object that is unlikely to move.

If the read tag information received from the tag reader control unit 302 contains information indicating an RF tag 13 attached to an object that is unlikely to move, the localization unit 309 transmits a position information request including tag ID contained in the read tag information to the management server 20 via the wireless communication unit 307. Upon reception of a position information response containing coordinates of the RF tag 13 corresponding to the tag ID from the management server 20 via the wireless communication unit 307, the localization unit 309 refers to the two-dimensional map storage unit 308 to extract an area near the coordinates contained in the position information response.

The localization unit 309 receives the sensing data from the range finder control unit 310, and retrieves an array of objects in the two-dimensional map similar to that of the received sensing data in the extracted area of the two-dimensional map. Accordingly, the localization unit 309 can reduce useless matching judgments, and identify a position of the information collection robot 30 in the entire two-dimensional map faster as compared with the case of retrieving the array of objects similar to that of the sensing data received from the range finder control unit 310.

In the case of a two-dimensional map which includes many places represented by similar arrays, there is a possibility of erroneously identifying the position of the information collection robot 30. However, since a rough position of the information collection robot 30 is identified by combining information indicating the fact that this is the RF tag 13, which is attached to an object that is unlikely to move, the position can certainly be identified faster.

According to an instruction from the tag information collection unit 301 or the tag information checking unit 311, the moving device control unit 303 controls the moving device 35 to move the information collection robot 30. The movable range storage unit 305 stores a movable range indicating a range in the two-dimensional map within which the information collection robot 30 can move. The movable range includes, for example, a plurality of line segments, and information on coordinates of start and end points of each line segment is stored as a movable range in the movable range storage unit 305. The movable range may be, for example, image data in which a movable area is indicated in black, while an unmovable area is indicated in white.

Figure 6:
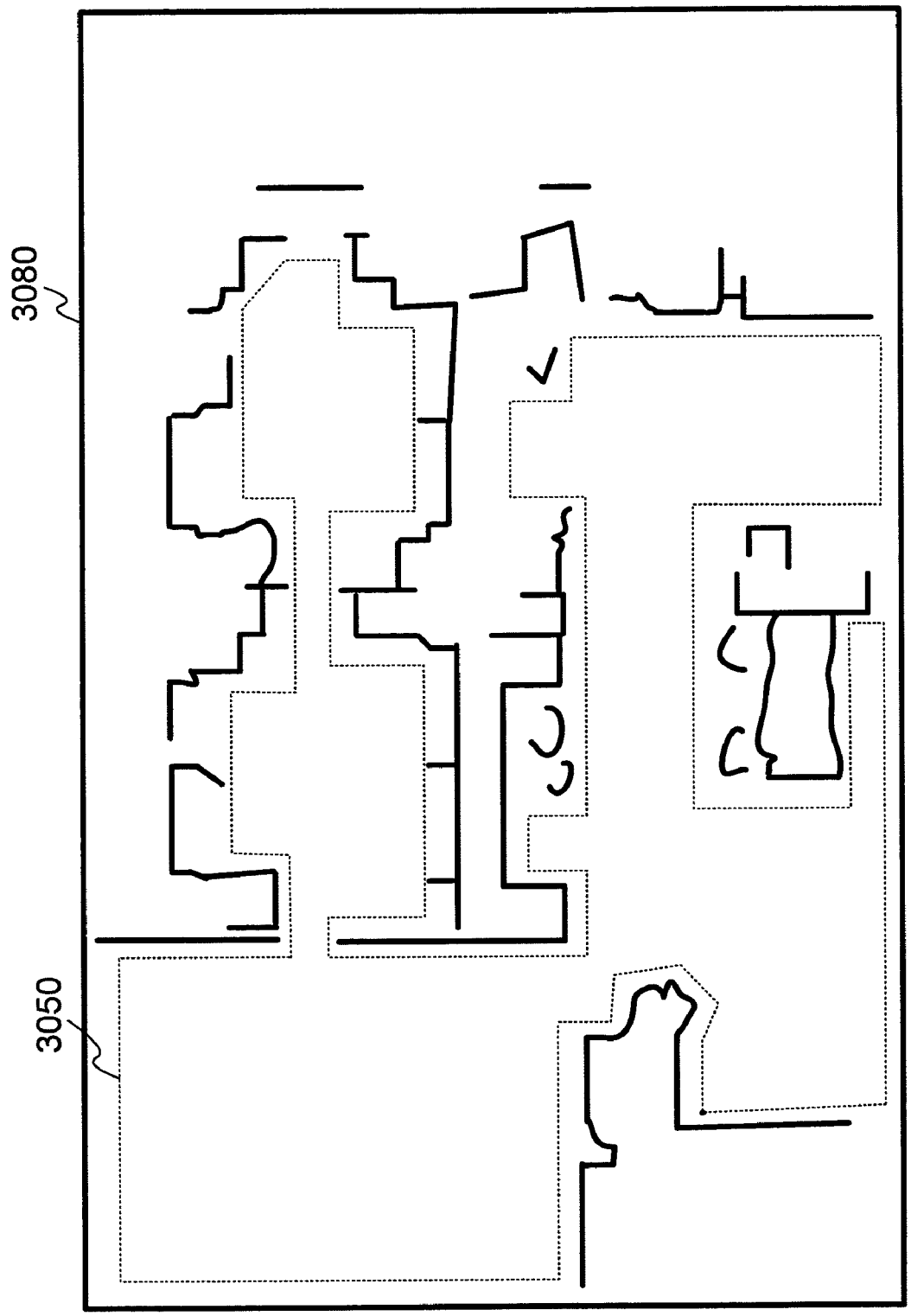
FIG. 6 is a conceptual diagram showing a movable range stored in a movable range storage unit.

The movable range 3050 stored in the movable range storage unit 305 is, for example, as shown in FIG. 6. In FIG. 6, for easier explanation, the movable range 3050 is displayed together with the two-dimensional map 3080. The movable range 3050 is calculated, for example, by judgment of collision between the three-dimensional map in the three-dimensional map storage unit 304 and a bounding box surrounding a three-dimensional model of the information collection robot 30, as a range in the two-dimensional map within which the information collection robot 30 can move without colliding with any objects other than the ground surface in the three-dimensional map. The movable range 3050 is set beforehand by the manager or the like, and registered in the movable range storage unit 305.

The tag reader characteristic storage unit 306 stores, for example, as shown in FIG. 7, for each radio wave intensity 3060 which identifies an intensity of a radio wave emitted from the tag reader 31, an emission-feasible area 3061 indicating a range of space in which the radio wave emitted with this intensity can reach, with an intensity which enables driving, by the radio wave, of the RF tag 13 that has received the radio wave, to return a response. According to this example, the radio wave intensity 3060 indicates that the intensity of a radio wave is higher as a number gets smaller. When measuring is carried out by using a sensor other than the tag reader 31, it is presumed that sensor characteristics indicating characteristics of the sensor have been stored (equivalent to the tag reader characteristic storage unit 306 in the case where the tag reader is used). A measurable area indicating which range can be measured at one time (equivalent to the emission-feasible area 3061 in the case where the tag reader 31 is used) is also stored.

Each emission-feasible area 3061 is represented by, for example, a polygon surrounding an space to be specified, and information of vertex coordinates of each polygon is stored as an emission-feasible area 3061 in the tag reader characteristic storage unit 306. The tag reader characteristic storage unit 306 stores emission-feasible areas 3061 of at least two types of radio wave intensities 3060. Data in the tag reader characteristic storage unit 306 is generated beforehand by the manager or the like, and is registered.

Figure 8:
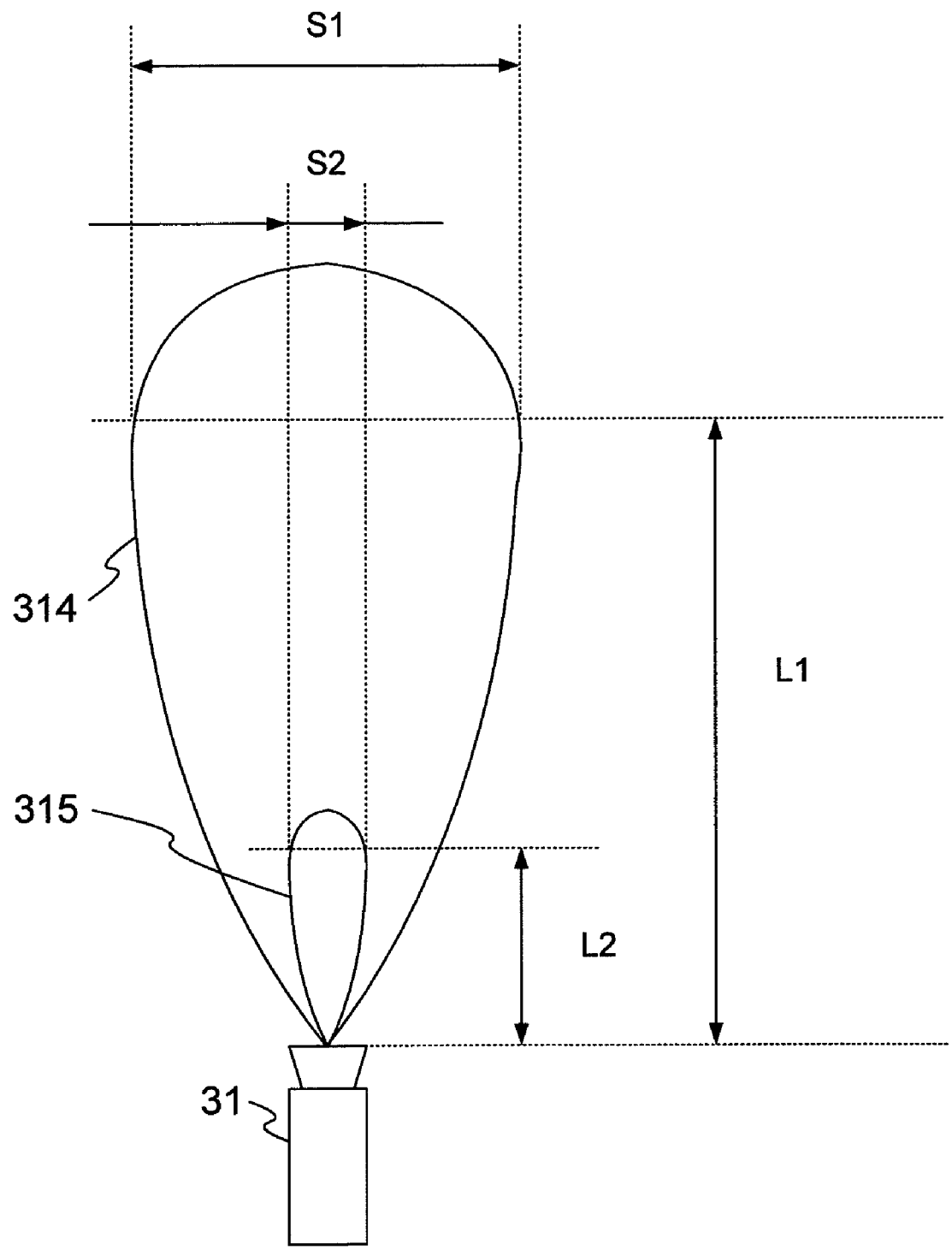
FIG. 8 is a conceptual diagram showing a space to which radio waves are emitted from a tag reader.

A relation between intensity of a radio wave emitted from the tag reader 31 and an emission-feasible area of the radio wave is, for example, as shown in FIG. 8. If the tag reader 31 emits a radio wave of high intensity, for example, the emission-feasible area is similar to an area 314, and a radio wave is emitted to a surface of an object located at a distance L1 from the tag reader 31 with an extent of an emission area S1. On the other hand, if the tag reader 31 emits a radio wave of low intensity, for example, the emission-feasible area is similar to an area 315, and a radio wave is emitted to a surface of an object at a distance L2 shorter than L1 with the extent of an emission area S2 smaller than the emission area S1.

The moving sequence storage unit 312 stores a moving sequence. Regarding the moving sequence, for example, as shown in FIG. 9, a data acquisition position 3121 indicating coordinates of the information collection robot 30, where the information collection robot 30 should be positioned when a radio wave is emitted from the tag reader 31 to the object surface to retrieve an RF tag 13 on the radio-wave received object surface, and tag information 3122 indicating information of an RF tag 13 whose read tag information is obtained at the data acquisition position 3121, correspond to a sequence 3120 passing through each data acquisition position 3121.

The data acquisition position 3121 is stored as two-dimensional coordinates in the two-dimensional map in the moving sequence storage unit 312. The tag information 3122 contains tag ID 3123 of the RF tag 13 and a tag position 3124 indicating coordinates of the RF tag 13 in the three-dimensional map. Upon reception of the moving sequence from the management server 20 via the wireless communication unit 307, the moving sequence reception unit 313 stores the received moving sequence in the moving sequence storage unit 312.

To move the tag reader 31 along the object surface of the three-dimensional map, upon reception of an information collection instruction containing designated space information indicating a space of the three-dimensional map to collect read tag information from the management server 20 via the wireless communication unit 307, the tag information collection unit 301 refers to the three-dimensional map storage unit 304 to divide the object surface of the three-dimensional map into measurement areas of predetermined sizes.

Figure 10:
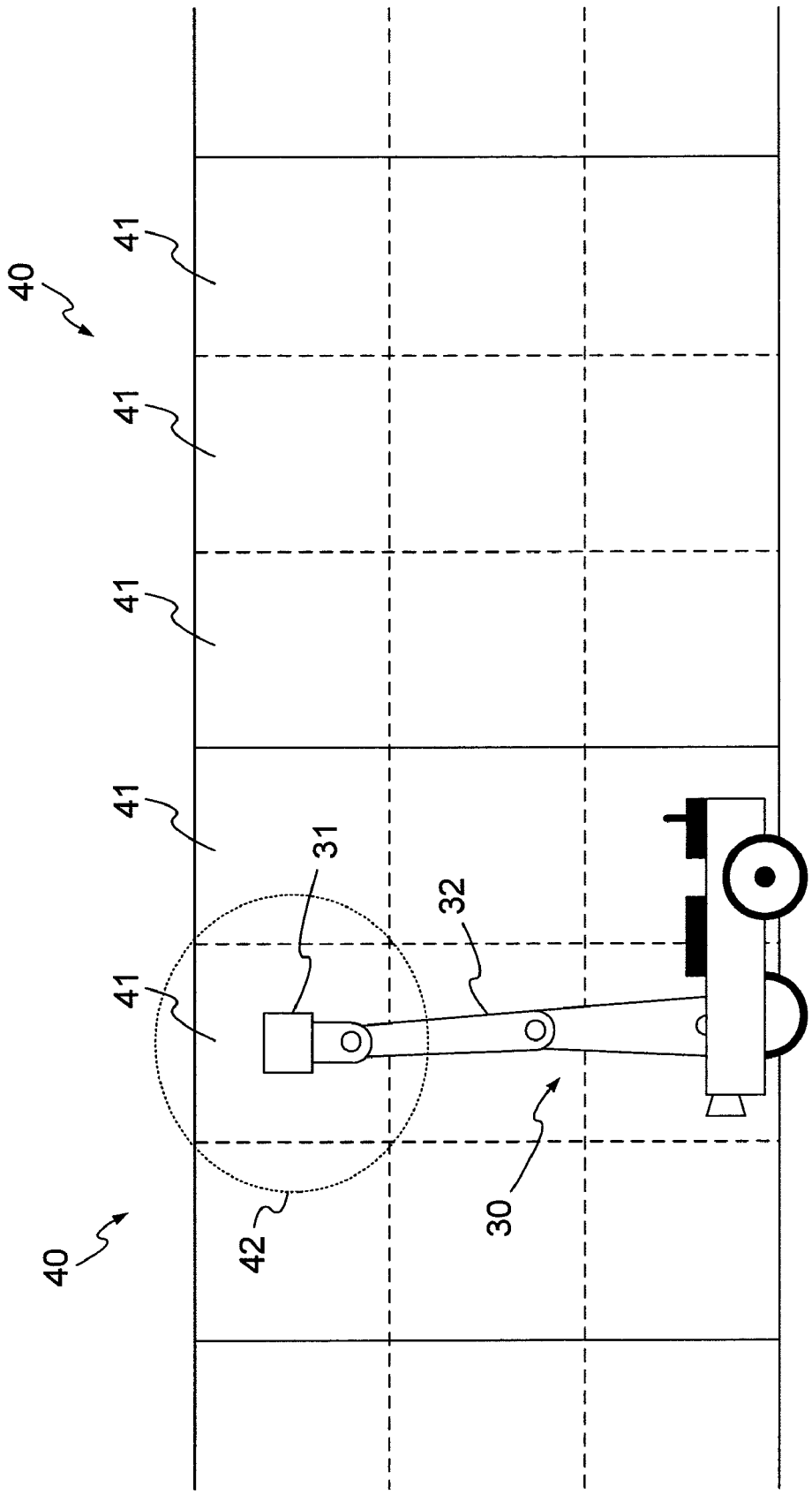
FIG. 10 is a conceptual diagram showing a measurement area and a group in a three-dimensional environment.

The designated space information is, for example, vertex coordinates of a plurality of polygons surrounding a space to be designated. The measurement area is, for example, an area 41 in FIG. 10, where radio waves can be emitted to the object surface within a widest range, by emitting a radio wave of highest intensity from the tag reader 31.

Figure 11:
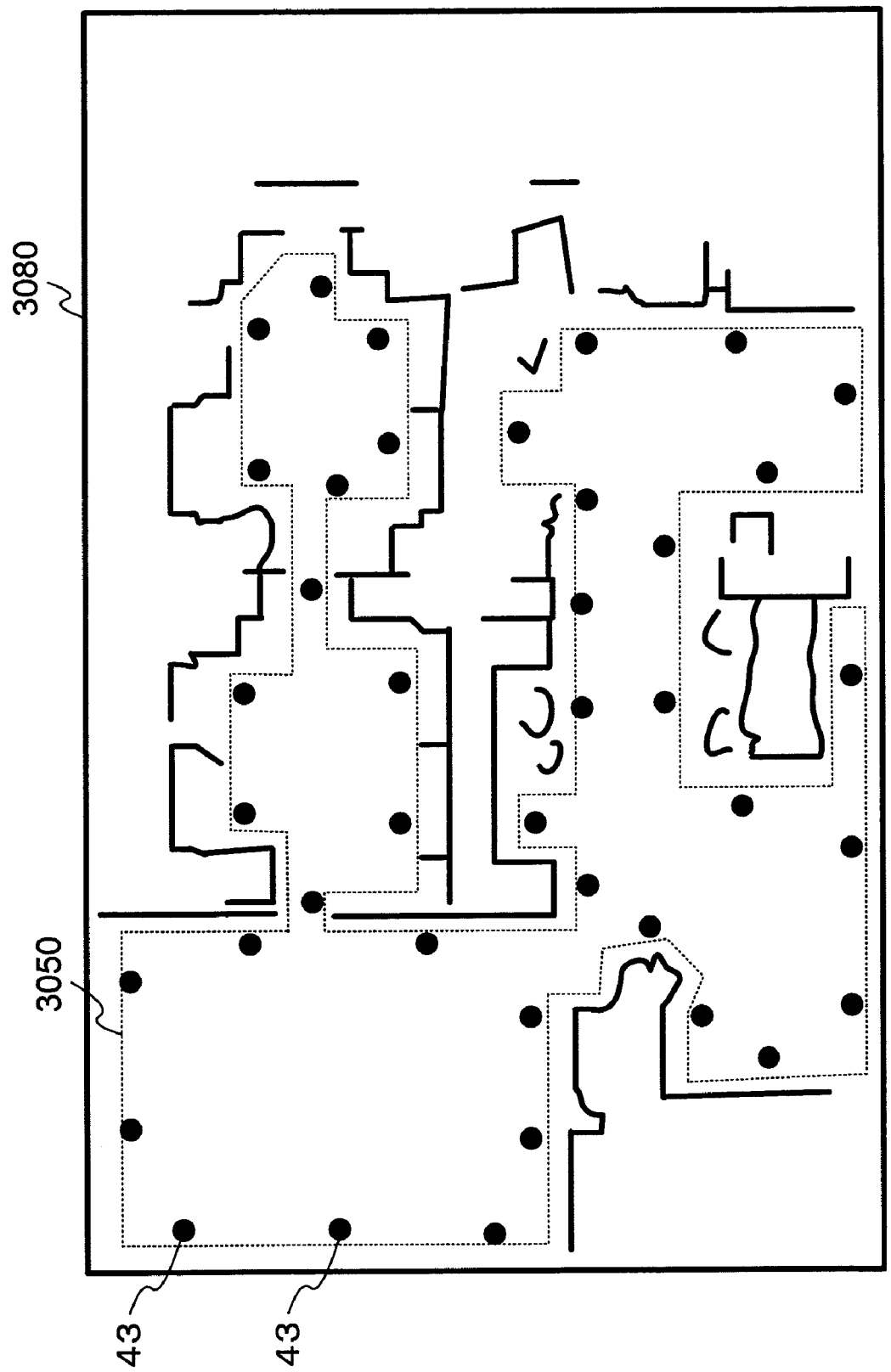
FIG. 11 is a conceptual diagram showing a data acquisition position in the two-dimensional map.

The tag information collection unit 301 groups the divided measurement areas for each of several measurement areas. In this case, the group is an area 40 surrounded by a solid line in FIG. 10, and the arm 32 is moved to group a plurality of measurement areas measurable without moving the information collection robot 30. The tag information collection unit 301 calculates, as a data acquisition position, for each group, a position of the information collection robot 30 from which all the measurement areas of the group can be measured without moving the information collection robot 30. Calculated data acquisition positions 43 are, for example, as shown in FIG. 11, when shown together with the two-dimensional map 3080 and the movable range 3050.

Information regarding the measurement area, the group, and the data acquisition position may be calculated beforehand by the manager or the like, and stored in the three-dimensional map storage unit 304 or the like. Upon reception of an information collection instruction from the management server 20, the tag information collection unit 301 may obtain the information regarding the measurement area, the group, and the data acquisition position from the three-dimensional map storage unit 304.

The tag information collection unit 301 selects one of the groups to which the measurement areas contained in the designated space information of the information collection instruction belong to specify a data acquisition position corresponding to the selected group in the two-dimensional map. The tag information collection unit 301 instructs the localization unit 309 to identify a position of the information collection robot 30. Based on the position of the information collection robot 30 identified by the localization unit 309, the tag information collection unit 301 refers to the movable range storage unit 305 and the two-dimensional map storage unit 308 to calculate a moving amount and a moving direction to the specified data acquisition position, and indicates the calculated moving amount and moving direction to the moving device control unit 303 to move the information collection robot 30 to the specified data acquisition position.

The tag information collection unit 301 selects one of the measurement areas of the group capable of collecting read tag information in the data acquisition position, and refers to the three-dimensional storage unit 304 and the tag reader characteristics storage unit 306 to calculate radio wave intensity, position of the tag reader 31, and emission direction of radio waves so that the selected measurement area as a whole can be included in an emission-feasible area of a radio wave of the highest intensity from the tag reader 31. The tag information collection unit 301 indicates the calculated radio wave intensity, position of the tag reader 31, and emission direction of the radio waves to the emission area changing unit 300 to emit radio waves from the tag reader 31 to the selected measurement area as a whole.

In response to the emitted radio waves, if no radio wave containing read tag information has been received, the tag information collection unit 301 calculates, for a measurement area of the group, to which no radio wave has been emitted, radio wave intensity for emitting radio waves to the entire measurement area, a position of the tag reader 31, and an emission direction of radio waves, and instructs the emission area changing unit 300 to emit radio waves to the entire measurement area.

A situation in which radio waves are emitted from the tag reader 31 to the selected measurement area as a whole is, for example, as shown in FIG. 12A. In FIG. 12A, reference numeral 316 indicates a measurement area in an object surface, and reference numeral 317 indicates an area in the object surface to which radio waves are emitted from the tag reader 31. If no radio wave containing read tag information has been received, the tag information collection unit 301 instructs the emission area changing unit 300 to emit radio waves to another measurement area 316.

In response to the emitted radio waves, if a radio wave containing read tag information has been received, the tag information collection unit 301 divides the measurement area which read tag information has returned, into small areas which the tag reader 31 can emit a radio wave of low intensity within a narrow range. The tag information collection unit 301 selects one of the divided small areas, and refers to the three-dimensional map storage unit 304 and the tag reader characteristic storage unit 306 to calculate radio wave intensity, a position of the tag reader 31, and an emission direction of radio waves so that the selected small area as a whole can be included in an emission space of the radio wave of low intensity. The tag information collection unit 301 indicates the calculated radio wave intensity, position of the tag reader 31, and emission direction of the radio waves to the emission area changing unit 300 to emit radio waves to the selected small area as a whole from the tag reader 31.

A situation in which radio waves are emitted from the tag reader 31 to the selected small area as a whole is, for example, as shown in FIG. 12B. In FIG. 12B, reference numeral 316 is a measurement area in the object surface, reference numeral 318 is an area in the object surface to which radio waves are emitted from the tag reader 31, and reference numeral 319 is a divided small area of the measurement area 316.

In response to the emitted radio waves, if no radio wave containing read tag information has been received, for another small area of the measurement area to which no radio wave of low intensity has been emitted, the tag information collection unit 301 calculates radio wave intensity for emitting radio waves to the entire small area, position of the tag reader 31, and emission direction of radio waves, and instructs the emission area changing unit 300 to emit radio waves to the entire small area. Accordingly, by carrying out gradual sensing where presence of an RF tag is checked in a wide area by radio waves of high intensity and only when an RF tag is present, the tag reader moves to the three-dimensional surface and emits radio waves of low intensity along the three-dimensional surface to investigate the RF tag, a specific position of RF tag can be efficiently retrieved. By carrying out sensing along the three-dimensional surface, even when something to block radio waves is present before the RF tag, because sensing is also executed from the upper surface of the RF tag, failure in acquisition of information can be reduced.

In response to the emitted radio waves, if a radio wave containing read tag information has been received, the tag information collection unit 301 specifies coordinates in the object surface of the small area from which the read tag information has returned as position information of the RF tag 13 which has transmitted the read tag information. The tag information collection unit 301 specifies, for example, a center axis (emission direction) of an emission-feasible area of a radio wave emitted from the tag reader 31 and coordinate of an intersection point with the object surface to which the radio wave has been emitted as position information of the RF tag 13.

The tag information collection unit 301 transmits first tag information containing the specified coordinates of the RF tag 13, the read tag information received from the RF tag 13, the data acquisition position of the information collection robot 30 when the read tag information is received, date and time of collecting the read tag information, and message indicating that information has been collected in response to an information collection instruction, to the management server 20 via the wireless communication unit 307.

Thus, first, when radio waves are emitted to the wide measurement area of the object surface, and a response is returned from the RF tag 13, the radio wave emission areas in the measurement area are narrowed down to specify a position of the RF tag 13 in more detail, whereby the tag information collection unit 301 can specify the position of the RF tag 13 quickly and with high accuracy.

When radio waves are emitted from the tag reader 31 to all the measurement areas included in the space designated during information collection, the tag information collection unit 301 transmits a collection end notification indicating an end of the information collection to the management server 20 via the wireless communication unit 307.

Upon reception of a position checking instruction containing designated space information indicating a space in the three-dimensional map to check position information of the RF tag 13 from the management server 20 via the wireless communication unit 307, the tag information checking unit 311 refers to the three-dimensional map storage unit 304 to divide the object surface of the three-dimensional map into the above-mentioned measurement areas. The tag information checking unit 311 groups the divided areas, and calculates a data acquisition position for each group. The designated space information contained in the position checking instruction is, for example, vertex coordinates of a plurality of polygons surrounding a space to be designated.

The tag information checking unit 311 specifies data acquisition positions of groups to which the measurement areas contained in the designated space information of the position checking instruction belong, and refers to the moving sequence storage unit 312 to extract a data acquisition position whose number indicating a sequence is smallest in the specified data acquisition positions. The tag information checking unit 311 instructs the localization unit 309 to identify a position of the information collection robot 30, and receives the identified position information of the information collection robot 30 from the localization unit 309.

The tag information checking unit 311 calculates a moving amount and a moving direction from a current position of the information collection robot 30 to the extracted data acquisition position, and indicates the calculated moving amount and direction to the moving device control unit 303 to move the information collection robot 30 to the extracted data acquisition position.

The tag information checking unit 311 refers to the moving sequence storage unit 312 in a data acquisition position of a moving destination to select an RF tag 13 whose read tag information can be obtained in the data acquisition position, and specifies small areas (refer to FIG. 12B) of an object surface including coordinates of the selected RF tag 13. The tag information checking unit 311 refers to the three-dimensional map storage unit 304 and the tag reader characteristic storage unit 306 to calculate radio wave intensity, a position of the tag reader 31, and an emission direction of radio waves so that the all specified small areas can be included in an emission-feasible area at radio waves of low intensity from the tag reader 31. The tag information checking unit 311 indicates the calculated radio wave intensity, position of the tag reader 31, and emission direction of radio waves to the emission area changing unit 300 to emit radio waves from the tag reader 31 to all the specified small areas.

Upon acquisition of read tag information of the selected RF tag 13 from a small area to which radio waves have been emitted, the tag information checking unit 311 transmits second tag information containing the coordinates of the RF tag 13, the read tag information received from the RF tag 13, a date and time of collecting the read tag information, and a message indicating that information has been collected in response to an information checking instruction, to the management server 20 via the wireless communication unit 307.

If no read tag information of the selected RF tag 13 has been obtained from the small area to which radio waves have been emitted, the tag information checking unit 311 instructs the emission area changing unit 300 to emit a radio wave of highest intensity to the entire measurement area including the small area (refer to FIG. 12A), and searches for the selected RF tag in the measurement area including the small area. This operation is carried out because slight shifting in position of an article may have caused a movement close to a previously obtained small area.

Upon acquisition of the read tag information of the selected RF tag 13 from the measurement area to which radio waves have been emitted, the tag information checking unit 311 emits radio waves of low intensity to small areas other than the small area to which a radio wave has been emitted among the small areas included in the measurement area to search for a small area where the selected RF tag 13 is located.

Upon specifying of a small area where the selected RF tag 13 is located, the tag information checking unit 311 transmits second tag information containing the coordinates of the RF tag 13, the read tag information received from the RF tag 13, a date and time of collecting the read tag information, and a message indicating that information has been collected in response to the information checking instruction, to the management server 20 via the wireless communication unit 307.

If no read tag information of the selected RF tag 13 has been obtained from the measurement area to which radio waves have been emitted, the tag information checking unit 311 refers to the moving sequence storage unit 312 to select one of other RF tags 13 whose read tag information can be obtained in the data acquisition position, and continues the process of checking a position of the selected RF tag 13.

If no other RF tags 13 whose read tag information can be obtained in the data acquisition position are present, the tag information checking unit 311 refers to the moving sequence storage unit 312 to instruct the moving device control unit 303 to move to the next data acquisition position. Upon emission of radio waves from the tag reader 31 to all measurement areas included in a space designated during information checking, the tag information checking unit 311 transmits a checking end notification indicating an end of information checking to the management server 20 via the wireless communication unit 307.

FIG. 13 is a block diagram showing an example of a functional configuration of the management server 20. The management server 20 includes a three-dimensional map storage unit 200, a display unit 201, a tag information storage unit 202, a position checking processing unit 203, a position information notification unit 204, a movable range storage unit 205, a moving sequence setting unit 206, a network interface 207, a tag information registration unit 208, a position checking instruction unit 209, a checking tag information storage unit 210, and an information collection instruction unit 211.

The three-dimensional map storage unit 200 stores a three-dimensional map. The three-dimensional map stored in the three-dimensional map storage unit 200 is similar to that stored in the three-dimensional map storage unit 304 of the information collection robot 30, and thus a detailed description thereof will be omitted. The movable range storage unit 205 stores information indicating a movable range of the information collection robot 30 in a two-dimensional map. The movable range stored in the movable range storage unit 205 is similar to that stored in the movable range storage unit 305 of the information collection robot 30, and thus a detailed description thereof will be omitted.

The network interface 207 communicates with the base station 12 via the communication line 11 according to a communication standard such as Ethernet (registered trademark). The position checking processing unit 203, the position information notification unit 204, the moving sequence setting unit 206, the tag information registration unit 208, the position checking instruction unit 209, and the information collection instruction unit 211 communicate with the information collection robot 30 via the network interface 207.

The tag information storage unit 202 stores, for example, as shown in FIG. 14, for each tag ID 2020, tag management information of the RF tag 13 corresponding to the tag ID 2020. Each tag management information stores a tag three-dimensional position 2021 indicating coordinates of the RF tag 13 in the three-dimensional map, a data acquisition position 2022 indicating a position of the information collection robot 30 when information of the RF tag 13 is collected, collection date and time 2023 indicating a date and time of collecting the information of the RF tag 13, and other information 2024 indicating other information contained in read tag information obtained from the RF tag 13 corresponding to the tag ID 2020.

Figure 15:
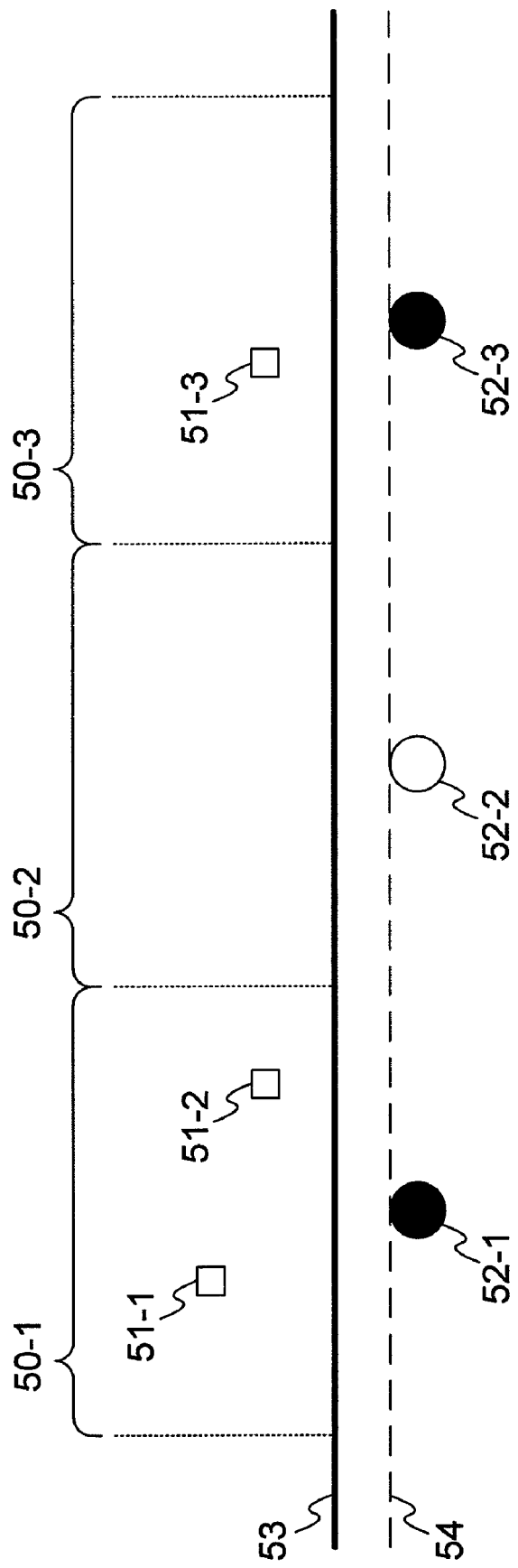
FIG. 15 is a conceptual diagram showing a positional relation between a tag three-dimensional position and a data acquisition position stored in the tag information storage unit.

A relation between the tag three-dimensional position and the data acquisition position stored in the tag information storage unit 202 in the two-dimensional map is, for example, as shown in FIG. 15. Codes 52-1 and 52-3 indicate data acquisition positions. Codes 51-1 to 51-3 indicate tag three-dimensional positions. Codes 50-1 and 50-3 indicate groups including measurement areas to which radio waves can be emitted without any movement of the information collection robot 30 from the data acquisition positions 52-1 and 52-3. A code 53 is a line indicating an outer shape of an object in the two-dimensional map, and a code 54 is a line indicating a movable range.

As shown in FIG. 15, the data acquisition positions 52-1 and 52-3 in which read tag information has been obtained from at least one RF tag are correlated with a tag three-dimensional position 51 of the RF tag 13 obtained in the data acquisition positions to be stored in the tag information storage unit 202. At a stage of collecting RF tag information, acquisition of read tag information is tried for all the groups in the three-dimensional map. Thus, while radio waves are emitted from the tag reader 31 to the measurement area of the group 50-2 in the data acquisition position 52-2, the data acquisition position 52-2 is not stored in the tag information storage unit 202 because no read tag information has been obtained.

The checking tag information storage unit 210 stores, for example, as shown in FIG. 16, a designated area 2100 which specifies an area to check information of the RF tag 13, and tag management information. The designated area 2100 stores vertex coordinates of a plurality of polygons surrounding a space that is designated. The tag management information stores, for each tag ID 2101, a tag three-dimensional position 2102 indicating coordinates of an RF tag 13 corresponding to the tag ID 2101 in the three-dimensional map, checking date and time 2103 indicating a date and time of checking the information of the RF tag 13, and other information 2104 indicating other information containing read tag information obtained from the RF tag 13 corresponding to the tag ID 2101.

When instructed to collect information of the RF tag 13 by a user, the information collection instruction unit 211 transmits, together with designated space information indicating a space of the three-dimensional map to retrieve the RF tag 13, an information collection instruction containing the designated space information to the information collection robot 30 via the network interface 207 by using an input device such as a mouse or a keyboard connected to the management server 20. The information collection instruction unit 211 deletes tag management information of the RF tag 13 positioned in the space designated by the designated space information from the tag information storage unit 202.

Figure 17:
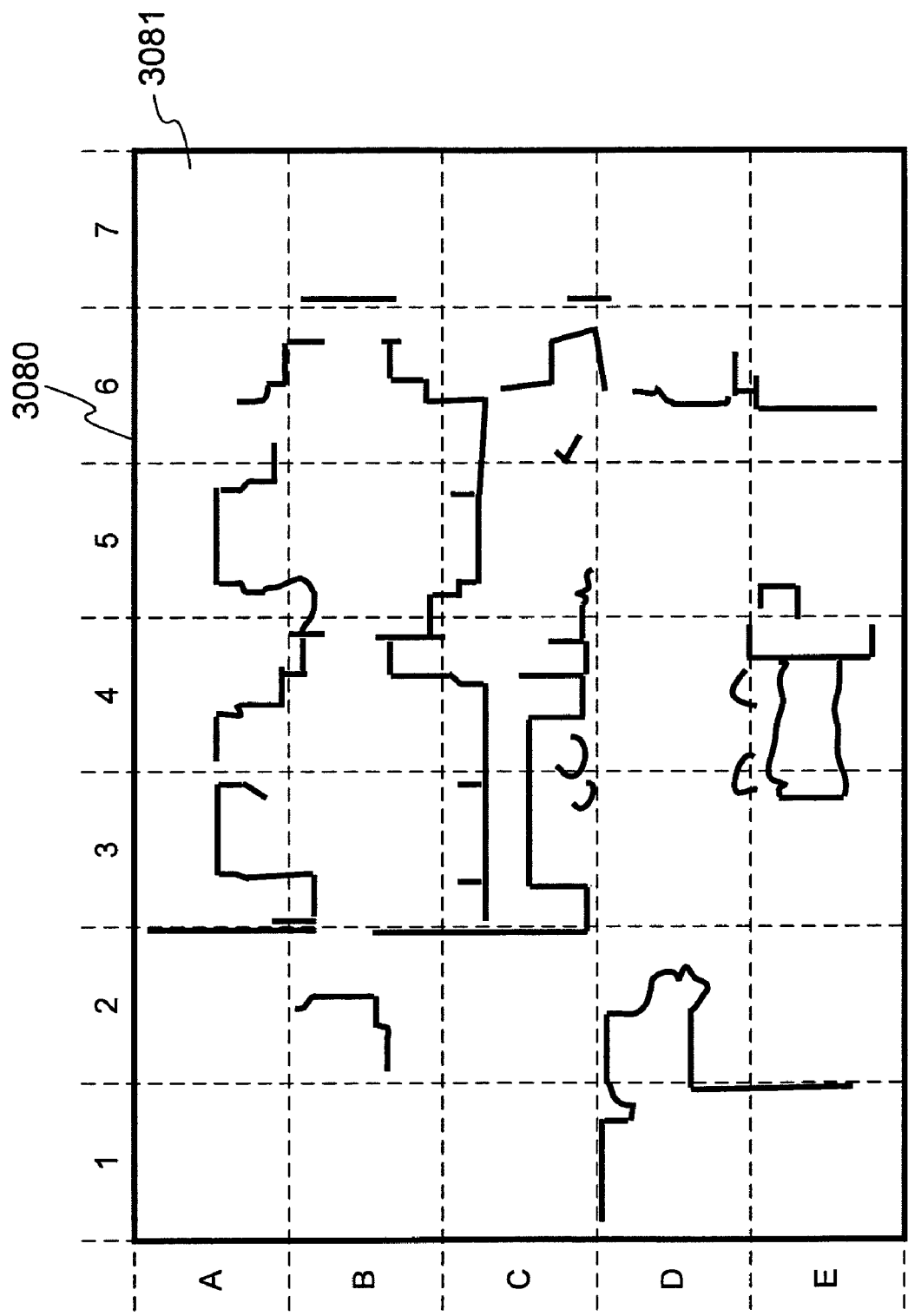
FIG. 17 is a conceptual diagram showing an example of range designation.

When instructed to collect information of the RF tag 13 without receiving any designated space information from the user, the information collection instruction unit 211 judges total space of the three-dimensional map that is designated space information, and executes processing. The information collection instruction unit 211 may, for example, as shown in FIG. 17, divide the two-dimensional map into predetermined areas 3081, and receive information indicating a divided area 3081 as designated space information from the user. In this case, the information collection instruction unit 211 sets a designated divided area 3081 as a range of a horizontal direction, and recognizes a space where a portion from an uppermost end to a lowermost end of the three-dimensional map is a range in a vertical direction, as designated space information.

When instructed by the user to check the position of the RF tag 13, the position checking instruction unit 209 deletes data from the checking tag information storage unit 210, and stores, together with designated space information indicating a range of checking the position of the RF tag 13, information indicating a space designated by the designated space information in the designated area 2100 of the checking tag information storage unit 210 via the input device connected to the management server 20. The position checking instruction unit 209 transmits an information checking instruction containing the designated space information to the information collection robot 30 via the network interface 207.

When instructed to check the position of the RF tag 13 without receiving designated space information from the user, the position checking instruction unit 209 judges a total space of the three-dimensional map to be designated space information, and executes processing. In the two-dimensional map divided as shown in FIG. 17, the position checking instruction unit 209 may receive information designating a divided area 3081 as designated space information from the user, set the designated divided area as a range of a horizontal direction, and recognize a space where a portion from the uppermost end to the lowermost end of the three-dimensional map is a range of a vertical direction as designated space information.

Upon reception of first tag information containing a message that information has been collected in response to an information collection instruction, the tag information registration unit 208 stores coordinates of the RF tag 13, other information contained in the read tag information, a data acquisition position of the information collection robot 30, and a collection date and time contained in the received first tag information in the tag information storage unit 202 in association with tag ID contained in the read tag information. Upon reception of second tag information containing a message that information has been collected in response to an information checking instruction, the tag information registration unit 208 stores coordinates of the RF tag 13, other information contained in the read tag information, and a checking date and time contained in the received second tag information in the checking tag information storage unit 210 in association with tag ID contained in the read tag information.

Upon reception of a collection end notification from the information collection robot 30 via the network interface 207, the moving sequence setting unit 206 refers to the tag information storage unit 202 to extract all data acquisition positions to which at least one tag ID correspond. The moving sequence setting unit 206 generates, for each of the extracted data acquisition positions, a number indicating a passing sequence, tag ID of an RF tag having read tag information to be obtained in the data acquisition position, and a moving sequence (refer to FIG. 9) to which a three-dimensional tag position of the RF tag corresponds, and transmits the generated moving sequence to the information collection robot 30 via the network interface 207.

The moving sequence setting unit 206 may refer to the tag information storage unit 202 and the movable range storage unit 205 to calculate a path passing through all the data acquisition positions within the movable range at a shortest moving distance, and to correlate numbers indicating sequences to the data acquisition positions in passing order of the calculated path.

Figure 18:
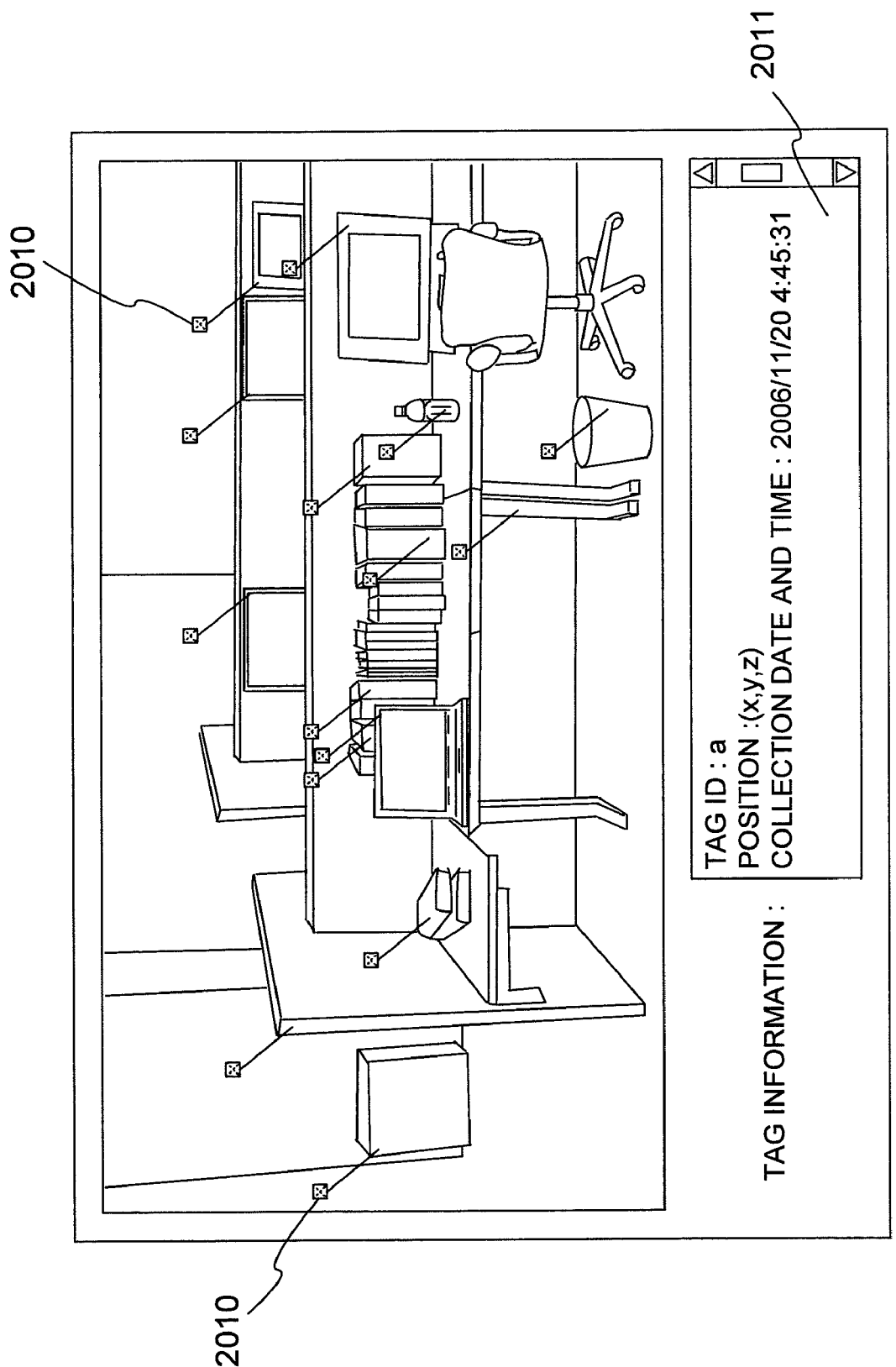
FIG. 18 is a diagram showing an example of display contents displayed in a display device by a display unit.

When instructed by the user to display the three-dimensional map via the input device of the management server 20, the display unit 201 refers to the three-dimensional map storage unit 200 and the tag information storage unit 202 to display, for example, as shown in FIG. 18, a screen where icons 2010 indicating positions of RF tags 13 are arranged in the three-dimensional map in the display device of the management server 20. Upon clicking of any one of the icons 2010 of the screen by a mouse, the display unit 201 displays information regarding an RF tag 13 corresponding to the clicked icon 2010 in a display area 2011.

Upon reception of a position information request from the information collection robot 30 via the network interface 207, the position information notification unit 204 extracts coordinates of tag ID contained in the received position information request from the tag information storage unit 202, and generates a position information response containing the extracted coordinates to transmit it to the information collection robot 30 via the network interface 207.

Upon reception of a checking end notification from the information collection robot 30 via the network interface 207, the position checking processing unit 203 extracts tag management information of an RF tag located in the area indicated by the designated area of the checking tag information storage unit 210 from the tag information storage unit 202. The position checking processing unit 203 creates, from the extracted tag management information and the tag management information of the checking tag information storage unit 210, a screen like that shown in FIG. 19 and provides a display in the display device of the management server 20.

The screen displayed in the display device by the position checking processing unit 203 displays, for each tag ID 2030, coordinates 2031 of an RF tag 13 collected according to an information collection instruction from the user and corresponding to the tag ID 2030, a collection date and time 2032 of the coordinates 2031, coordinates 2033 of an RF tag 13 collected according to a position checking instruction from the user and corresponding to the tag ID 2030, a checking date and time 2034 of the coordinates 2033, and other information 2035 contained in read tag information obtained from the RF tag 13 corresponding to the tag ID 2030. By referring to the screen such as that shown in FIG. 19, the user can manage positions and the number of articles to which RF tags 13 are attached.

Figure 20:
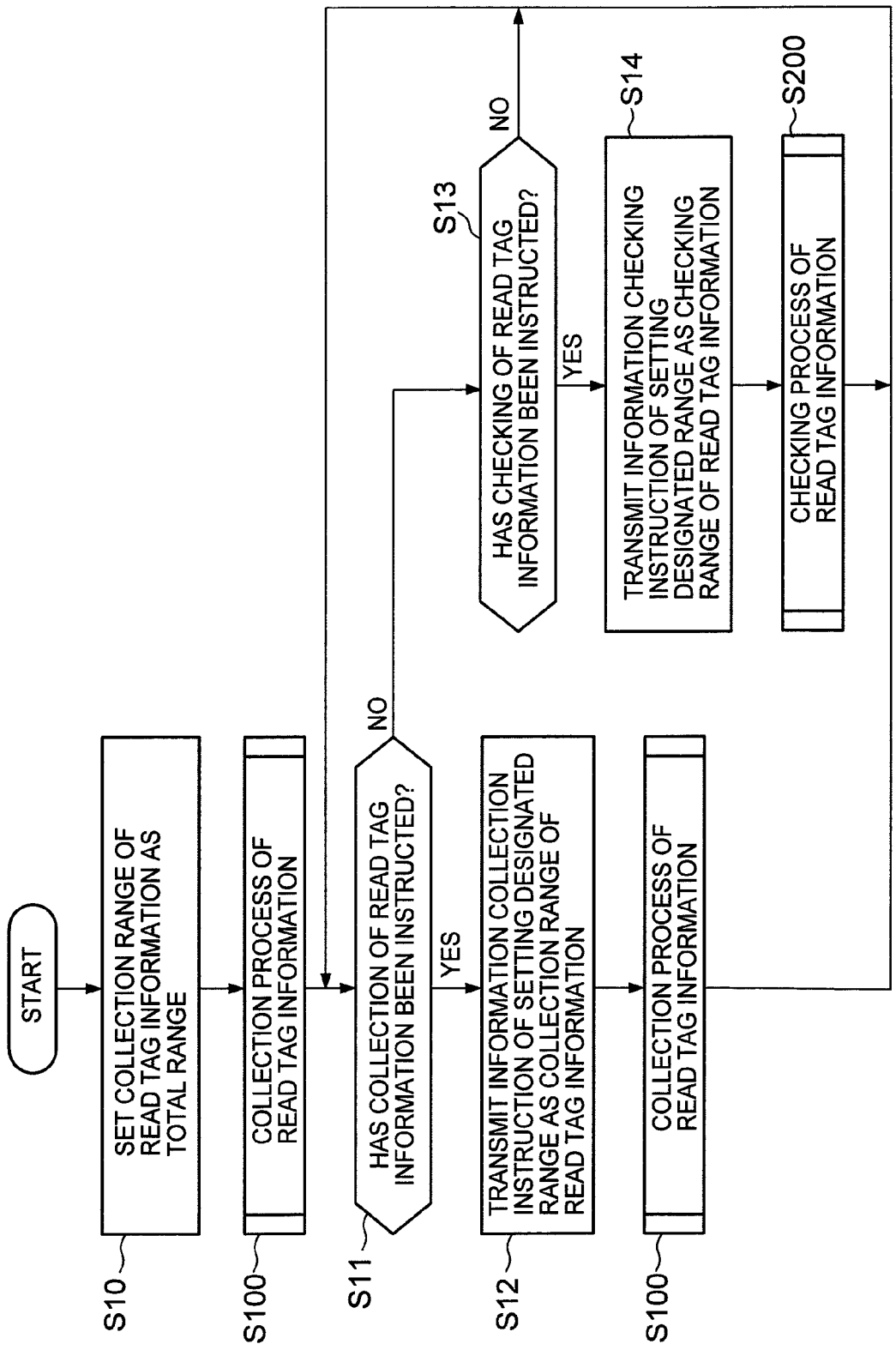
FIG. 20 is a flowchart showing an example of operation of the information collection system.

FIG. 20 is a flowchart showing an example of an operation in which the information collection system 10 is used. First, to collect information of RF tags 13 in a room, the management server 20 sets a collection range of read tag information as a total range in a three-dimensional map (S10), and transmits an information collection instruction in which the collection range is designated space information to the information collection robot 30. The information collection robot 30 collects read tag information from the RF tags 13 targeting the total range of the three-dimensional map according to the received information collection instruction through executing a process of collecting position information of the RF tags 13 (S100). Data collected by the information collection robot 30 is stored in the management server 20.

During work such as inventory checking or inventory taking, when instructed by the user to collect read tag information of the RF tags 13 in an area together with information designating the area of the three-dimensional map to collect the read tag information (S11: YES), the management server 20 transmits an information collection instruction containing designated space information which designates the area to the information collection robot 30 (S12). The information collection robot 30 refers to the designated space information contained in the received information collection instruction to execute a process of collecting read tag information from the RF tags 13 for the area of the three-dimensional map designated by the designated space information (S100).

During work such as inventory checking or inventory taking, when instructed by the user to check read tag information of the RF tags 13 in an area together with information indicating the area of the three-dimensional map to collect the read tag information (S13: YES), the management server 20 transmits an information checking instruction containing designated space information which designates the area to the information collection robot 30 (S14). The information collection robot 30 refers to the designated space information contained in the received information checking instruction to execute a process of checking the read tag information from the RF tags 13 for the area of the three-dimensional map designated by the designated space information (S200).

Figure 21:
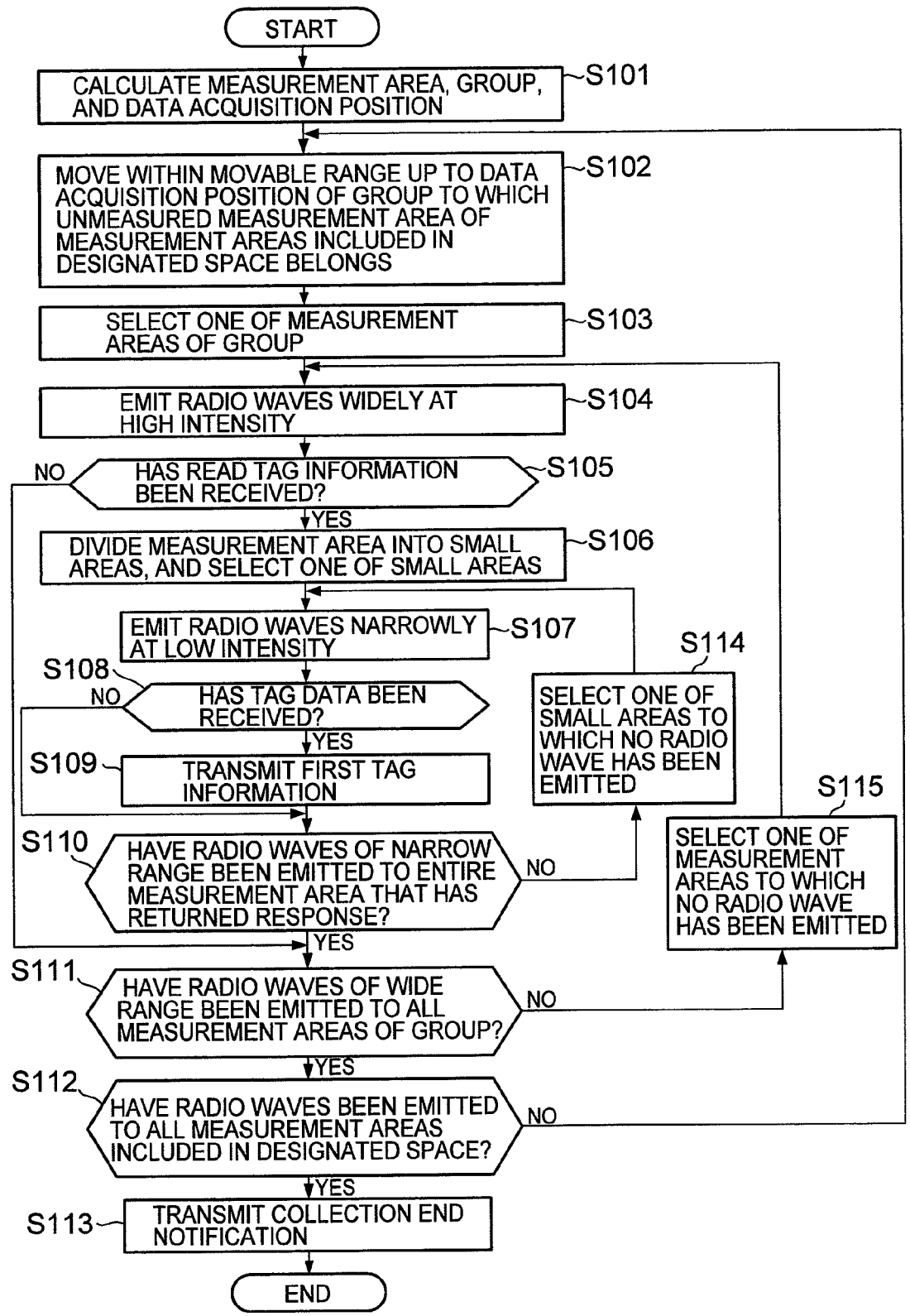
FIG. 21 is a flowchart showing an example of a read tag information collection process in the information collection robot.

FIG. 21 is a flowchart showing an example of the read tag information collection process (S100) in the information collection robot 30. By receiving an information collection instruction from the management server 20 via the base station 12, the information collection robot 30 starts an operation of the flowchart.

First, the tag information collection unit 301 refers to the three-dimensional map storage unit 304 to divide the three-dimensional map into measurement areas, and groups a predetermined number of measurement areas. The tag information collection unit 301 calculates a data acquisition position for each group (S101). The tag information collection unit 301 instructs the localization unit 309 to identify a position of the information collection robot 30. Based on the position of the information collection robot 30 identified by the localization unit 309, the tag information collection unit 301 refers to the movable range storage unit 305 and the two-dimensional map storage unit 308 to calculate a moving amount and a moving direction to the calculated data acquisition position, and indicates the calculated moving amount and direction to the moving device control unit 303 to move the information collection robot 30 to the calculated data acquisition position (S102).

The tag information collection unit 301 selects one of the measurement areas of the group (S103), and instructs the emission area changing unit 300 to emit radio waves of high intensity widely to an object surface (S104) The tag information collection unit 301 judges whether read tag information has been received from an RF tag 13 via the tag reader control unit 302 (S105). If no read tag information has been received (S105: NO), the tag information collection unit 301 executes a step S111.

Upon reception of read tag information (S105: YES), the tag information collection unit 301 further divides the measurement area selected in the step S103 into small areas, and selects one of the divided small areas (S106). The emission area changing unit 300 is instructed to emit radio waves of low intensity narrowly to the selected small area of the object surface (S107). The tag information collection unit 301 judges whether read tag information has been received from an RF tag 13 via the tag reader control unit 302 (S108). If no read tag information has been received (S108: NO), the tag information collection unit 301 executes a step S110.

Upon reception of read tag information (S108: YES), the tag information collection unit 301 specifies coordinates of the RF tag 13 which has transmitted the read tag information, and transmits first tag information containing the specified coordinates, the received read tag information, data acquisition information of the information collection robot 30 when the read tag information is received, a date and time of collecting the read tag information, and information indicating that information has been collected in response to an information collection instruction to the management server 20 via the wireless communication unit 307 (S109).

The tag information collection unit 301 judges whether radio waves of a narrow range have been emitted to the entire measurement area which has received the read tag information (S110). If a small area to which no radio wave of a narrow range has been emitted is present in the measurement area which has received the read tag information (S110: NO), the tag information collection unit 301 instructs the emission area changing unit 300 to select one of the small areas to which no radio waves of a narrow range have been emitted (S114), and executes the step S107 again.

If radio waves of a narrow range have been emitted to the entire measurement area which has received the read tag information (S110: YES), the tag information collection unit 301 judges whether radio waves of a wide range have been emitted to all the measurement areas of the group selected in the step S103 (S111). If the group includes measurement areas to which no radio waves of a wide range have been emitted (S111: NO), the tag information collection unit 301 selects one of the measurement areas of the group to which no radio waves of a wide range have been emitted (S115) to execute the step S104 again.

Upon emission of radio waves of a wide range to all the measurement areas of the group (S111: YES), the tag information collection unit 301 judges whether radio waves have been emitted widely to all the measurement areas included in a space designated by designated space information (S112). If a measurement area to which no radio wave has been emitted widely is present in the space designated by the designated space information (S112: NO), the tag information collection unit 301 executes the step S102 again.

Upon wide emission of radio waves to all the measurement areas included in the space designated by the designated space information (S112: YES), the tag information collection unit 301 transmits a collection end notification to the management server 20 via the wireless communication unit 307 (S113). The information collection robot 30 finishes the read tag information collection process of the flowchart.

Figure 22:
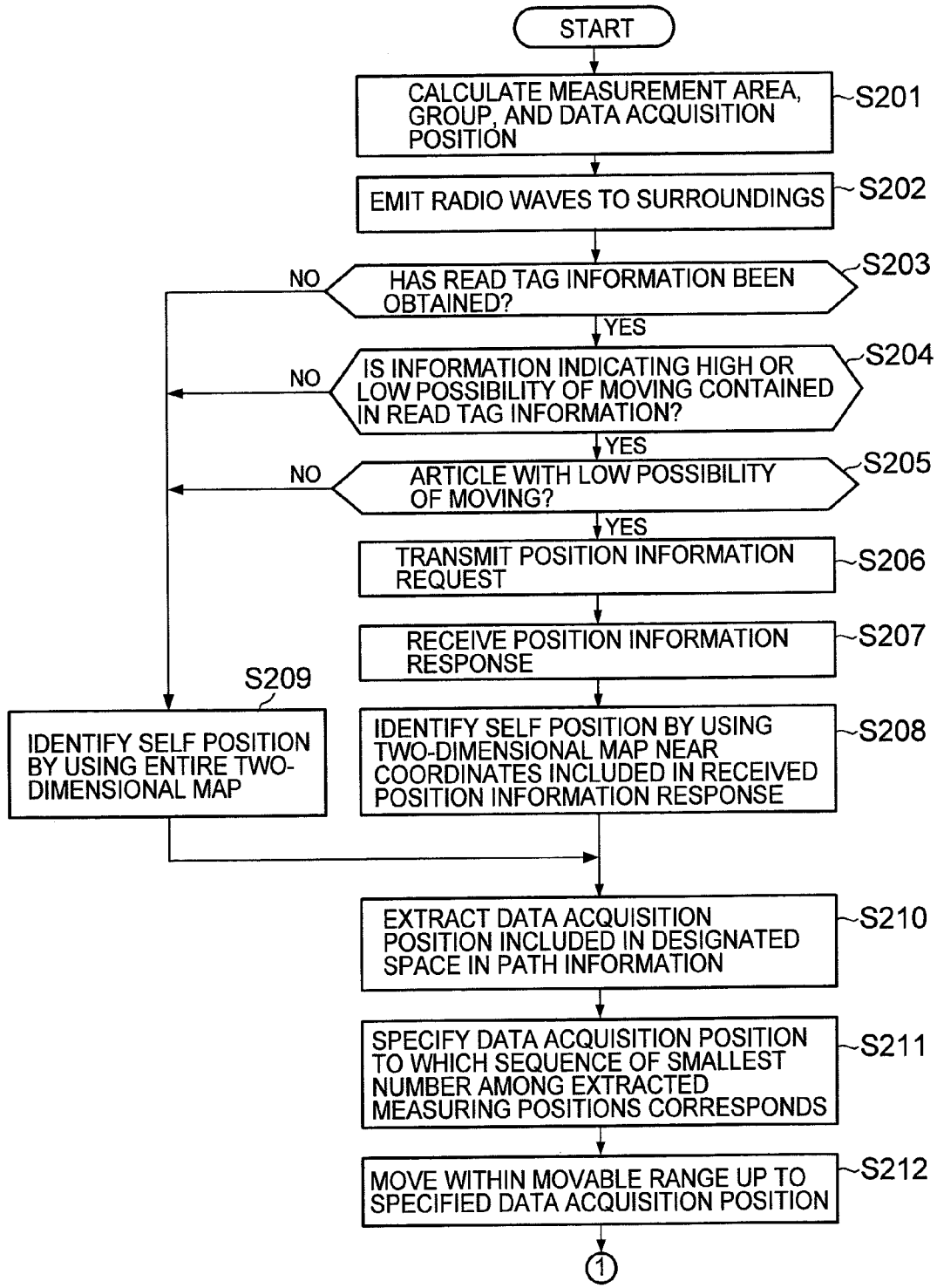
FIG. 22 is a flowchart showing an example of a read tag information checking process in the information collection robot.
Figure 23:
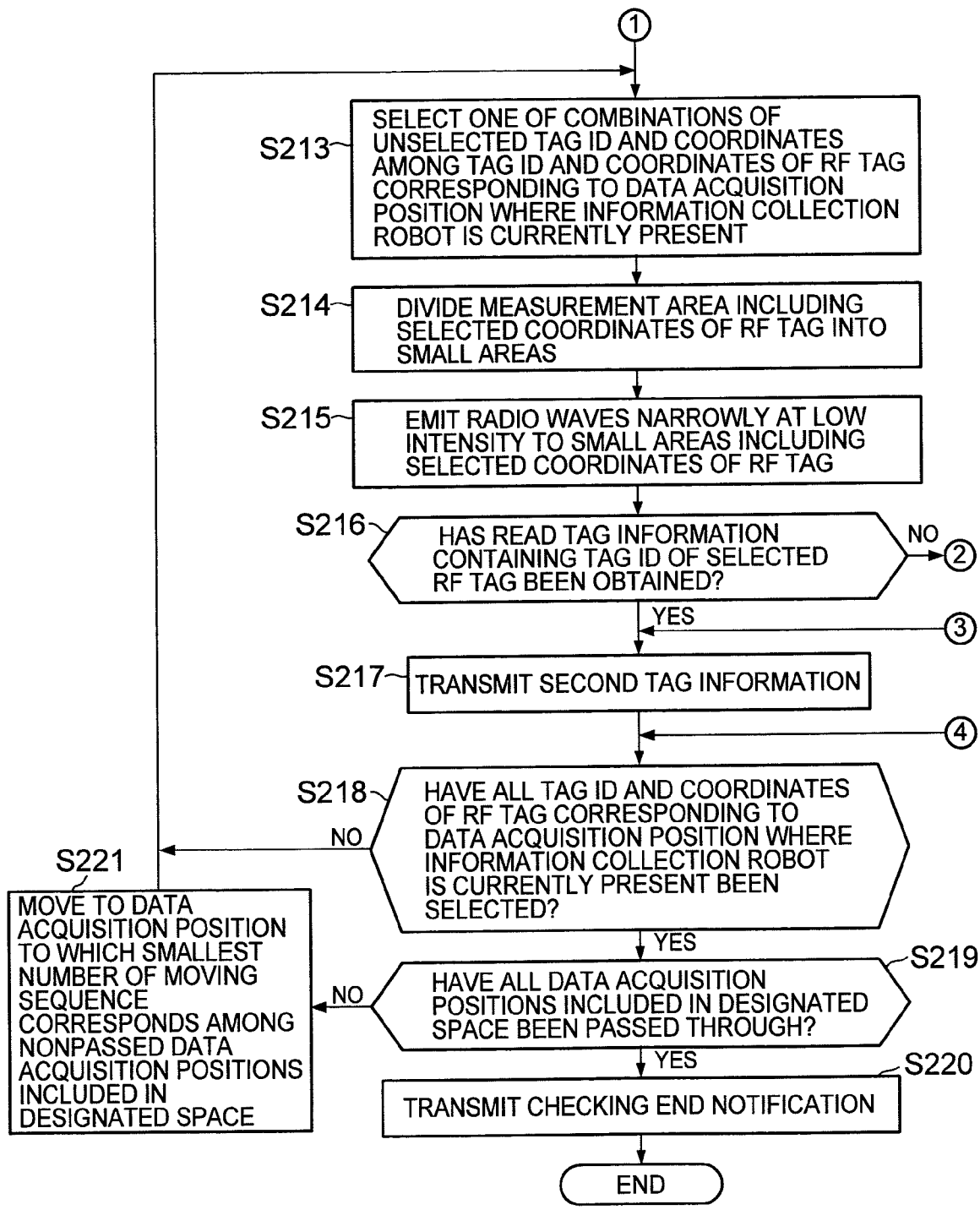
FIG. 23 is a flowchart showing an example of the read tag information checking process in the information collection robot.
Figure 24:
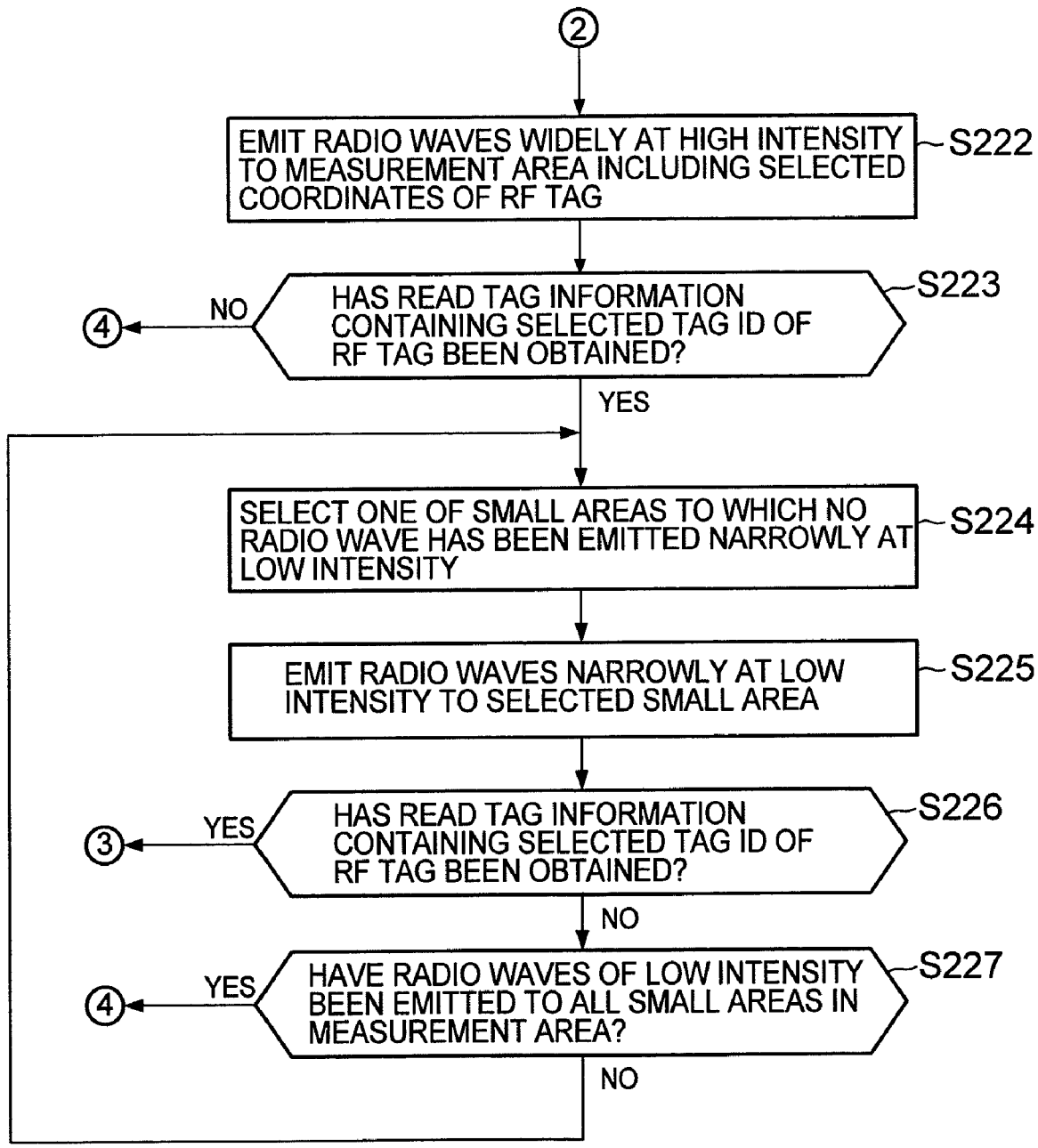
FIG. 24 is a flowchart showing an example of the read tag information checking process in the information collection robot.

FIGS. 22 to 24 are flowcharts each showing an example of the read tag information checking process (S200) in the information collection robot 30. By receiving a position checking instruction from the management server 20 via the base station 12, the information collection robot 30 starts an operation of the flowchart.

First, the tag information checking unit 311 refers to the three-dimensional map storage unit 304 to divide an object surface in the three-dimensional map into measurement areas, and groups the predetermined number of measurement areas. Then, the tag information checking unit 311 calculates a data acquisition position for each group (S201). The tag information checking unit 311 instructs the localization unit 309 to identify a position of the information collection robot 30.

The localization unit 309 instructs the emission area changing unit 300 to emit radio waves from the tag reader 31 to the surroundings of the information collection robot 30 (S202). The tag information checking unit 311 judges whether read tag information has been obtained from the RF tag 13 via the tag reader control unit 302 (S203). If no read tag information has been obtained from the RF tag 13 (S203: NO), the localization unit 309 retrieves an array of objects similar to an array of sensing data obtained from the range finder control unit 310 in the entire two-dimensional map stored in the two-dimensional map storage unit 308 to identify a position of the information collection robot 30 (S209), and executes step S210.

Upon acquisition of read tag information from the RF tag 13 (S203: YES), the tag information checking unit 311 judges whether the received read tag information contains information indicating the RF tag 13 attached to an object that is unlikely to move (S204). If the read tag information contains the information indicating the RF tag 13 attached to the object that is unlikely to move (S204: YES), the tag information checking unit 311 judges whether the information indicates the RF tag 13 attached to the object that is unlikely to move (S205).

If the read tag information contains no information indicating the RF tag 13 attached to the object that is unlikely to move (S204: NO), or information indicating an RF tag 13 attached to an object that is likely to move (S205: NO), the localization unit 309 executes step S209.

If the read tag information contains information indicating the RF tag 13 attached to the object that is unlikely to move (S205: YES), the localization unit 309 transmits a position information request including tag ID contained in the read tag information to the management server 20 via the wireless communication unit 307 (S206). The localization unit 309 receives a position information response containing coordinates of an RF tag 13 corresponding to the tag ID from the management server 20 via the wireless communication unit 307 (S207).

The localization unit 309 refers to the two-dimensional map storage unit 308 to extract an area near the coordinates contained in the position information response, and retrieves an array of objects in the two-dimensional map similar to the array of sensing data obtained from the range finder control unit 310 in the extracted area of the two-dimensional map to identify a position of the information collection robot 30 (S208).

The tag information checking unit 311 extracts, among data acquisition positions stored in the moving sequence storage unit 312, data acquisition positions included in a space designated by designated space information of a position checking instruction (S210), and specifies a data acquisition position to which a sequence of a smallest number corresponds among the extracted data acquisition positions (S211).

Based on the position of the information collection robot 30 identified by the localization unit 309, the tag information checking unit 311 refers to the movable range storage unit 305 and the two-dimensional map storage unit 308 to calculate a moving amount and a moving direction to the specified data acquisition position, and indicates the calculated moving amount and direction to the moving device control unit 303 to move the information collection robot 30 to the specified data acquisition position (S212).

The tag information checking unit 311 refers to the moving sequence storage unit 312 in a data acquisition position of a moving destination to select one combination of unselected tag ID and coordinates among tag ID and coordinates of an RF tag 13 corresponding to coordinates of a data acquisition position where the information collection robot 30 is currently located (S213 of FIG. 23). The tag information checking unit 311 divides a measurement area including the coordinates of the selected RF tag into small areas (S214), and instructs the emission area changing unit 300 to emit radio waves of low intensity narrowly to an object surface toward the small areas including the coordinates of the selected RF tag 13 (S215).

The tag information checking unit 311 judges, via the tag reader control unit 302, whether the read tag information containing the tag ID of the RF tag 13 selected in the step S213 has been obtained (S216). If the read tag information containing the tag ID of the RF tag 13 selected in the step S213 has been obtained (step S216: YES), the tag information checking unit 311 transmits second tag information containing the coordinates of the RF tag 13, the read tag information received from the RF tag 13, a date and time of collecting the read tag information, and a message that information has been collected in response to an information checking instruction to the management server 20 via the wireless communication unit 307 (S217).

The tag information checking unit 311 refers to the moving sequence storage unit 312 to judge whether tag ID and coordinates of the RF tag 13 corresponding to the coordinates of the data acquisition position where the information collection robot 30 is currently located have all been selected (S218). If all of the tag ID and the coordinates of the RF tag 13 corresponding to the coordinates of the data acquisition position where the information collection robot 30 is currently located has not been selected (S218: NO), the tag information collection unit 311 executes the step S213 again.

Upon selection of all the tag ID and the coordinates of the RF tag 13 corresponding to the coordinates of the data acquisition position where the information collection robot 30 is currently located (S218: YES), the tag information checking unit 311 judges passage through all the data acquisition positions included in the space designated by the information checking instruction (S219) Upon passage through all the data acquisition positions included in the space designated by the information checking instruction (S219: YES), the tag information checking unit 311 transmits a checking end notification indicating an end of information checking to the management server 20 via the wireless communication unit 307 (S220). The information collection robot 30 finishes the read tag information checking process of the flowchart.

If not all the data acquisition positions included in the space designated by the information checking instruction have been passed through (S219: NO), the tag information checking unit 311 refers to the moving sequence storage unit 312 to instruct the moving device control unit 303 to move to a data acquisition position to which a smallest number of a moving sequence corresponds, among the non-passed data acquisition positions included in the designated space (S221), and the step S213 is executed again.

If no read tag information containing the tag ID of the RF tag 13 selected in the step S213 is obtained in the step S216 (S216: NO), the tag information checking unit 311 instructs the emission area changing unit 300 to emit radio waves of high intensity widely to the entire measurement area including the coordinates of the RF tag 13 selected in the step S213 (S222 of FIG. 24).

The tag information checking unit 311 judges, via the tag reader control unit 302, whether read tag information containing the tag ID of the RF tag 13 selected in the step S213 has been obtained (S223). If no read tag information containing the tag ID of the RF tag 13 selected in the step S213 has been obtained (S223: NO), the tag information checking unit 311 executes step S218 of FIG. 23.

Upon acquisition of read tag information containing the tag ID of the RF tag 13 selected in the step S213 (S223: YES), the tag information checking unit 311 selects one small area to which radio waves of low intensity have not been emitted among measurement areas to which radio waves of high intensity have been emitted widely (S224). The tag information checking unit 311 instructs the emission area changing unit 300 to emit radio waves of low intensity narrowly to the object surface toward the selected small area (S225).

The tag information checking unit 311 judges, via the tag reader control unit 302, whether read tag information containing the tag ID of the RF tag 13 selected in the step S213 has been obtained (S226). If read tag information containing the tag ID of the RF tag 13 selected in the step S213 has been obtained (S226: Yes), the tag information checking unit 311 executes step S217 of FIG. 23.

If no read tag information containing the tag ID of the RF tag 13 selected in the step S213 has been obtained (S226: NO), the tag information checking unit 311 judges whether radio waves of low intensity have been emitted to all the small areas of the measurement area to which radio waves of high intensity have been emitted widely (S227). If radio waves of low intensity have been emitted to all the small areas of the measurement area to which radio waves of high intensity have been emitted widely (S227: YES), the tag information checking unit 311 executes the step S218 of FIG. 23. If radio waves of low intensity have not been emitted to all the small areas of the measurement area to which radio waves of high intensity have been emitted widely (S227: NO), the tag information checking unit 311 executes the step S224 again.

Figure 25:
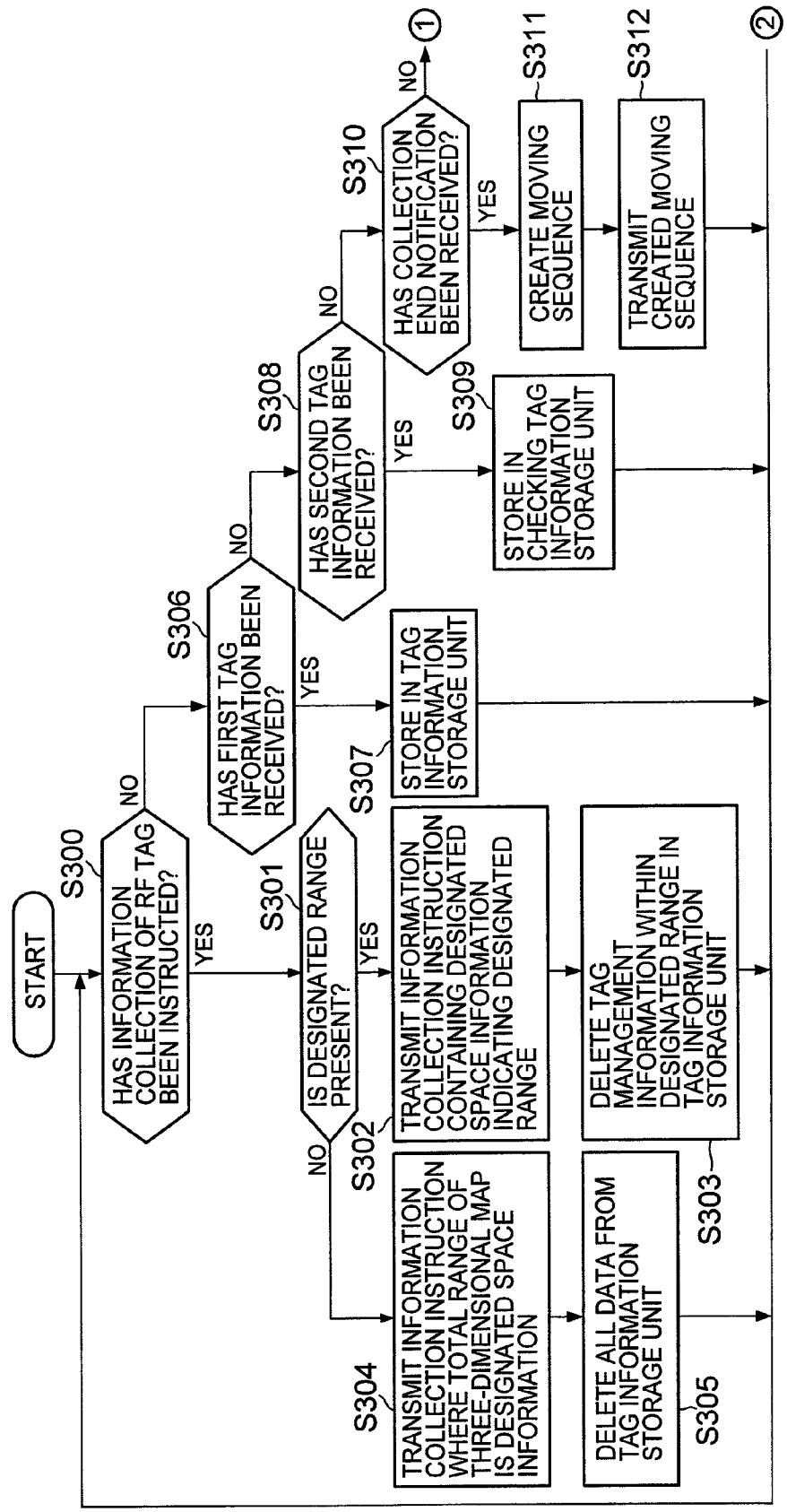
FIG. 25 is a flowchart showing an example of operation of the management server.
Figure 26:
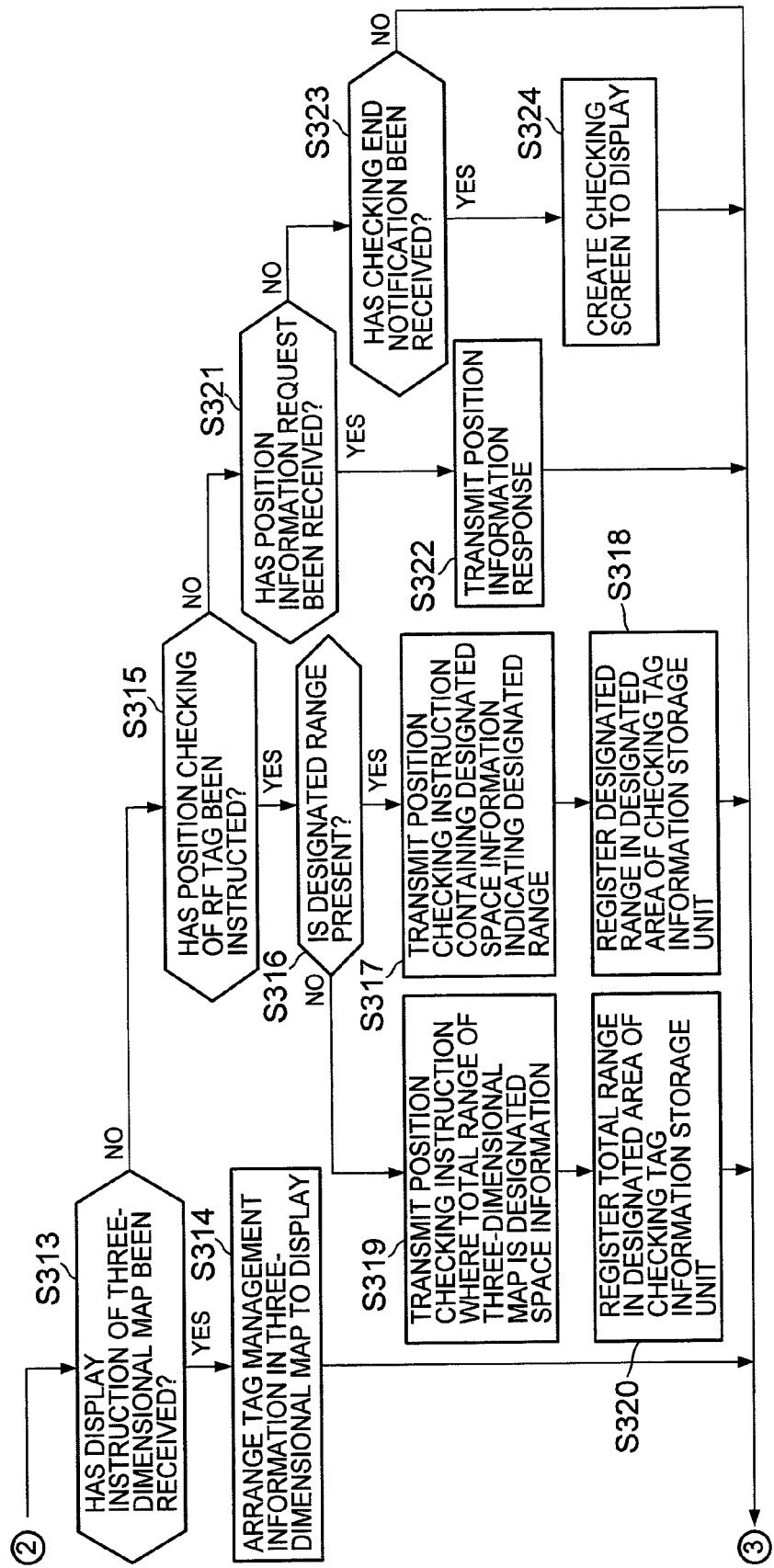
FIG. 26 is a flowchart showing an example of operation of the management server.

FIGS. 25 and 26 are flowcharts each showing an example of an operation of the management server 20.

First, the information collection instruction unit 211 judges whether the user has given instructions to collect information of the RF tag 13 (S300). If the user has given instructions to collect information of the RF tag 13 (S300: YES), the information collection instruction unit 211 judges whether information designating a range of collecting read tag information of the RF tag 13 has been received together with the information collection instruction (S301).

Upon reception of the information designating a range of collecting read tag information of the RF tag 13 (S301: YES), the information collection instruction unit 211 transmits an information collection instruction containing designated space information indicating the designated range to the information collection robot 30 via the network interface 207 (S302). The information collection instruction unit 211 deletes tag management information of the RF tag 13 contained in the designated space information from the tag information storage unit 202 (S303) to execute the step S300 again.

If no information designating a range of collecting read tag information of the RF tag 13 has been received (S301: NO), the information collection instruction unit 211 transmits an information collection instruction indicating that a total space of the three-dimensional map corresponds to designated space information to the information collection robot 30 via the network interface 207 (S304). The information collection instruction unit 211 deletes all data from the tag information storage unit 202 to execute the step S300 again.

If the user has not given instructions to collect information of the RF tag 13 (S300: NO), the tag information registration unit 208 judges whether first tag information has been received from the information collection robot 30 via the network interface 207 (S306). If first tag information has been received from the information collection robot 30 (S306: YES), the tag information registration unit 208 stores read tag information and the like contained in the received first tag information in the tag information storage unit 202 (S308), and the information collection instruction unit 211 executes the step S300 again.

If first tag information has not been received from the information collection robot 30 (S306: NO), the tag information registration unit 208 judges whether second tag information has been received from the information collection robot 30 (S308). If second tag information has been received from the information collection robot 30 (S308: YES), the tag information registration unit 208 stores read tag information and the like contained in the received second tag information in the checking tag information storage unit 210 (S309), and the information collection instruction unit 211 executes the step S300 again.

If second tag information has not been received from the information collection robot 30 (S308: NO), the moving sequence setting unit 206 judges whether a collection end notification has been received (S310). If a collection end notification has been received (S310: YES), the moving sequence setting unit 206 refers to the tag information storage unit 202 and the movable range storage unit 205 to set a moving sequence (S311). The moving sequence setting unit 206 transmits the set moving sequence to the information collection robot 30 via the network interface 207 (S312), and the information collection instruction unit 211 executes the step S300 again.

If a collection end notification has not been received (S310: NO), the display unit 201 judges whether the user has given instructions to display the three-dimensional map (S313 of FIG. 26). If the user has given instructions to display the three-dimensional map (S313: YES), the display unit 201 refers to the three-dimensional map storage unit 200 and the tag information storage unit 202 to display a screen where icons indicating positions of RF tags 13 are arranged in the three-dimensional map in the display device of the management server 20 (S314), and the information collection instruction unit 211 executes the step S300 again.

If the user has not given instructions to display the three-dimensional map (S313: NO), the position checking instruction unit 209 judges whether the user has given instructions to check a position of the RF tag 13 (S315). If the user has given instructions to check a position of the RF tag 13 (S315: YES), the position checking instruction unit 209 judges whether information designating a range of collecting information of the RF tag 13 has been received together with the position checking instruction (S316).

If information designating a range of collecting information of the RF tag 13 has been received (S316: YES), the position checking instruction unit 209 transmits a position checking instruction containing designated space information indicating the designated range to the information collection robot 30 via the network interface 207 (S317). The position checking instruction unit 209 deletes all the data from the checking tag information storage unit 210 to register the designated space information in the space information of the checking tag information storage unit 210 (S318), and the information collection instruction unit 211 executes the step S300 again.

If information designating a range of collecting information of the RF tag 13 has not been received (S316: NO), the position checking instruction unit 209 transmits a position checking instruction indicating that the total space of the three-dimensional map corresponds to designated space information to the information collection robot 30 via the network interface 207 (S319). The position checking instruction unit 209 deletes all the data from the checking tag information storage unit 210 to register the designated space information in the space information of the checking tag information storage unit 210 (S320), and the information collection instruction unit 211 executes the step S300 again.

If the user has not given instructions to check a position of the RF tag 13 (S315: NO), the position information notification unit 204 judges whether a position information request has been received from the information collection robot 30 via the network interface 207 (S321). If a position information request has been received (S321: YES), the position information notification unit 204 extracts coordinates of a tag ID contained in the received position information request from the tag information storage unit 202, and generates a position information response containing the extracted coordinates to transmit the position information response to the information collection robot 30 via the network interface 207 (S322). The information collection instruction unit 211 executes the step S300 again.

If a position information request has not been received (S321: NO), the position checking processing unit 203 judges whether a checking end notification has been received from the information collection robot 30 via the network interface 207 (S323). If a checking end notification has not been received (S323: NO), the information collection instruction unit 211 executes the step S300 again.

If a checking end notification has been received (S323: YES), the position checking processing unit 203 refers to the tag information storage unit 202 and the checking tag information storage unit 210 to display a checking screen used for comparing tag information stored in the tag information storage unit 202 with tag information stored in the checking tag information storage unit 210 in the display device of the management server 20 (S324). The information collection instruction unit 211 executes the step S300 again.

The embodiment of the present invention has been described.

As apparent from the foregoing, according to the information collection system 10 of the embodiment, since a moving sequence indicating a passing sequence of data collection positions for collecting information of RF tags 13 is automatically generated, the information collection robot 30 can automatically calculate a travel path based on the generated moving sequence, the two-dimensional map, and information of the movable range in the two-dimensional map.

The present invention is not limited to the embodiment. Various changes can be made without departing from the gist of the invention.

Figure 27:
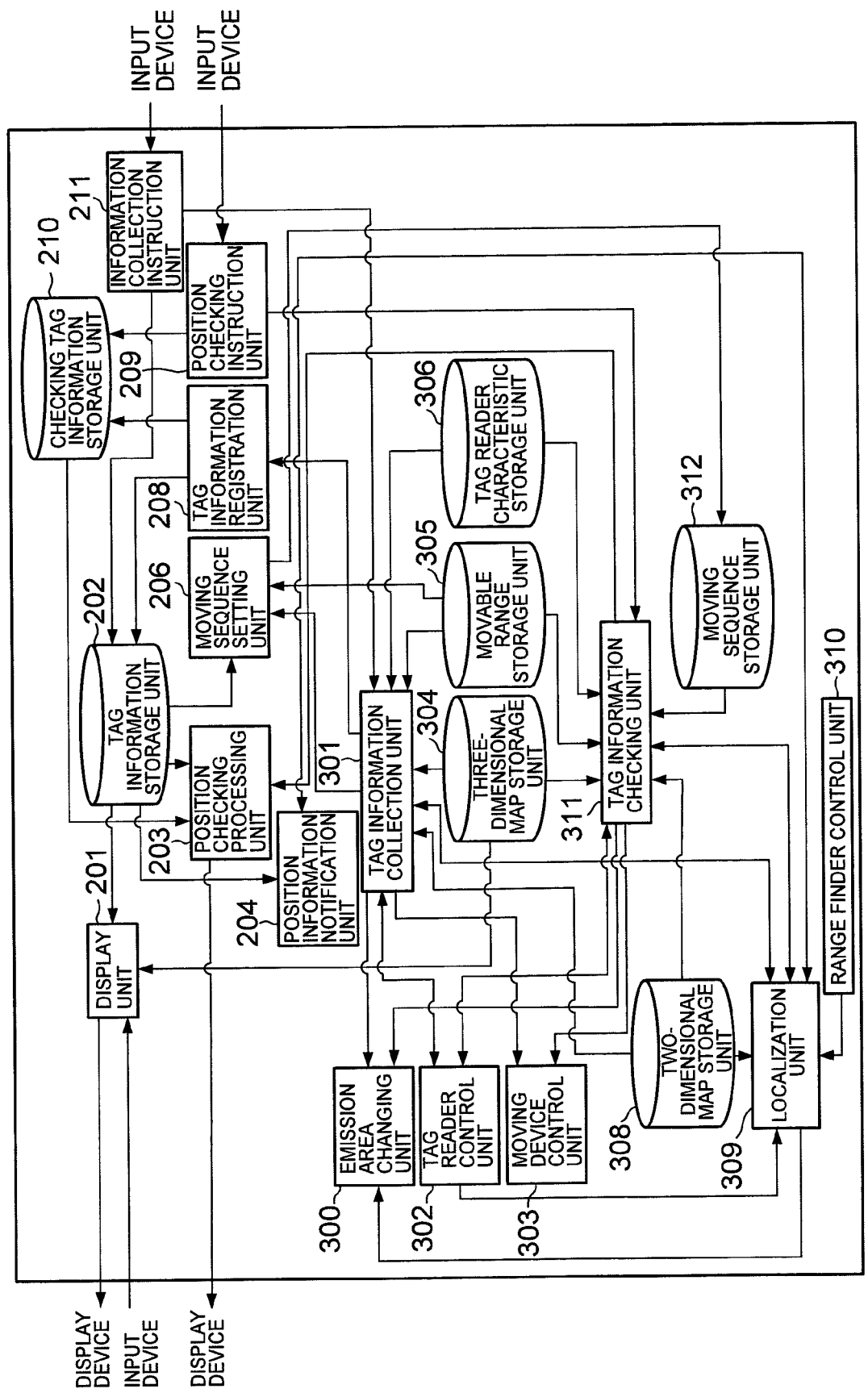
FIG. 27 is a block diagram showing another example of a functional configuration of the information collection robot.

For example, the information collection system 10 of the embodiment includes the management server 20 and the information collection robot 30. As another embodiment, however, for example, as shown in FIG. 27, the information collection robot 30 may be provided with functions of the management server 20 so that the information collection robot 30 can realize collection of position information of RF tags 13, outputting of a collection result, checking of position information, outputting of a checking result, and the like by itself. According to the embodiment shown in FIG. 27, the information collection robot 30 includes an input device such as a keyboard and a display device such as a liquid crystal display (LCD).

The embodiment has been described by way of example where the RF tag 13 is attached to the article. However, as another embodiment, a barcode recorded with identification information or the like of an article may be attached to the article. In this case, a camera and a barcode reader is attached to a tip of the arm 32 of the information collection robot 30. According to this embodiment, a wide range of a three-dimensional environment is first shot by the camera, and presence of a barcode in the shot image is judged by image recognition. If a barcode is present in the shot image, the arm 32 is controlled, and the barcode reader is brought close to the barcode to read its information.

A tag reader 31, a camera used for recognizing a position of a barcode, and a barcode reader may be attached to the tip of the arm 32, a barcode may be written in the RF tag 13, and a tag ID may be recorded in the barcode. In this case, the information collection robot 30 emits radio waves to an object surface, and images the object surface for each measurement area, and transmits information obtained by at least one of the tag reader and the barcode reader as read tag information to the management server 20. Accordingly, even when the RF tag 13 is attached to a conductive member to disable proper transmission/reception of radio waves, the information collection robot 30 can obtain the information recorded in the barcode, and thus can obtain information of articles in the three-dimensional map.

In addition to reading of the read tag information of the RF tag by the tag reader, and reading of the barcode by the camera or the barcode reader, for example, reading of colors by the camera, reading of temperatures of various places in the room by a thermometer, reading of sounds of various places in the room by a sound concentrator, reading of a vibration situation of a designated place by a vibration gauge, and the like are carried out to obtain information. By arranging places of the information obtained in the three-dimensional map, a three-dimensional map containing various information (tag, color, sound, temperature, and the like) which correspond to one another can be created.

An operation of collecting information contents is called crawling in the Web field. The information collection system and the information collection robot of the present invention can be applied to real world crawling where a crawling target is expanded to a real space.

What is claimed is:

1. An information collection system comprising:
   an information collection robot which automatically collects information indicating a position of an ID tag which stores a tag ID to identify the ID tag; and
   a management server which manages the information collected by the information collection robot; wherein:
   the information collection robot includes:
   a first three-dimensional map storage unit which stores a three-dimensional map which is a set of surface coordinates of a three-dimensional environment;
   a two-dimensional map storage unit which stores a two-dimensional map which is a set of three-dimensional coordinates at a predetermined height in the three-dimensional map;
   a first movable range storage unit which stores a movable range which is information indicating a movable area of the information collection robot in the two-dimensional map;
   a moving unit which moves the information collection robot;

a sensor which reads the tag ID stored in the ID tag attached to an object in a room;

a sensor characteristic storage unit which stores a measurable area indicating a three-dimensional area where a radio wave emitted by the sensor reaches;

a localization unit which estimates coordinates of the information collection robot in the two-dimensional map;

a tag information collection unit which moves, upon reception of an information collection instruction to collect ID tag information from the management server, the information collection robot within the movable range in the two-dimensional map by using the moving unit, moves the sensor while measuring along an object surface shown in the three-dimensional map by using the sensor at a moving destination, specifies a surface area of the three-dimensional map measurable by the sensor, based on a data acquisition position indicated by coordinates of the information collection robot when the tag ID is obtained from the ID tag, the measurable area stored in the sensor characteristic storage unit, orientation of the sensor, and the three-dimensional map, and transmits first tag information containing coordinates in the specified surface area, the data acquisition position, and the obtained tag ID, to the management server;

a moving sequence storage unit which stores a moving sequence where via-positions, as coordinates to be passed through by the information collection robot in the movable range and as coordinates at which coordinates of the ID tag and the tag ID are to be collected by using the sensor, are correlated with information indicating a passing sequence of the information collection robot; and a moving sequence reception unit which stores, upon reception of the moving sequence from the management server, the received moving sequence in the moving sequence storage unit; and the management server includes:

a tag information storage unit which stores, in association with the tag ID, coordinates of the ID tag corresponding to the tag ID and the data acquisition position of the information collection robot when the tag ID is obtained;

a second movable range storage unit which stores the movable range;

an information collection instruction unit which transmits the information collection instruction to the information collection robot according to a request from a user;

a tag information registration unit which stores, upon reception of the first tag information from the information collection robot, the received first tag information in the tag information storage unit; and a moving sequence setting unit which refers to the tag information storage unit and the second movable range storage unit to set data acquisition positions as the via-positions, and generates a moving sequence where the passing sequence is correlated with the via-positions, and transmits the generated moving sequence to the information collection robot.

2. The information collection system according to claim 1, wherein:

the information collection robot further includes a tag information checking unit which moves, upon reception of a position checking instruction to check the position of the ID tag from the management server, the information collection robot within the movable range according to the moving sequence by using the moving unit, moves the sensor while measuring along the object surface in the three-dimensional map by using the sensor at the data acquisition positions of the moving sequence, specifies, upon acquisition of the tag ID from the ID tag, the surface area of the three-dimensional map measurable by the sensor, based on the coordinates of the information collection robot estimated by the localization unit, the measurable area stored in the sensor characteristic storage unit, the orientation of the sensor, and the three-dimensional map, and transmits second tag information containing coordinates of the specified surface area and the obtained tag ID to the management server; and the management server further includes:

a position checking instruction unit which transmits the position checking instruction to the information collection robot at timing instructed by the user; and a position checking processing unit which notifies to the user upon reception of the second tag information, for each tag ID, coordinates of the ID tag stored in the tag information storage unit and coordinates of the ID tag contained in the second tag information.

3. The information collection system according to claim 1, wherein:

the information collection robot further includes a range finder which measures distance and direction from the information collection robot to a point on the object surface a the predetermined height; and the localization unit measures distance and direction from the information collection robot to each of a plurality of points on the object surface at the predetermined height by using the range finder, specifies a shape of an object in the two-dimensional map similar to an arrangement of the plurality of points, and estimates coordinates of the information collection robot in a position closest to a positional relation between the plurality of points and the information collection robot, near the specified shape.

4. The information collection system according to claim 3, wherein:

the management server further includes a position information notification unit which extracts, from the tag information storage unit, upon reception of a position information request containing the tag ID from the information collection robot, coordinates corresponding to the tag ID contained in the position information request, and transmits a position information response containing the extracted coordinates to the information collection robot; and the localization unit causes the sensor to try to acquire the tag ID from the ID tag, transmits to the management server, upon acquisition of the tag ID by the sensor, the position information request containing the tag ID, extracts, upon reception of the position information response from the management server, an area of the two-dimensional map within a predetermined range from coordinates contained in the position information response, and specifies a shape similar to an arrangement of the plurality of points of the object surface obtained by the range finder in the extracted area.

5. The information collection system according to claim 4, wherein:

the ID tag stores, in addition to the tag ID, information indicating whether the ID tag is attached to an object with a low possibility of moving; and the localization unit transmits, when the sensor obtains, from the ID tag, the tag ID and the information indicating that the ID tag is attached to the object with the low possibility of moving, the position information request containing the tag ID, to the management server.

6. The information collection system according to claim 1, wherein:
the information collection robot further includes a measurement area changing unit which moves the sensor to change the measurement area of the object surface measurable by the sensor; and
the tag information collection unit causes, while causing the measurement area changing unit to change the measurement area at the moving destination, the sensor to try to obtain the tag ID from the ID tag, and specifies, when the sensor obtains the tag ID, the surface area of the three-dimensional map measurable by the sensor, based on the position of the information collection robot estimated by the localization unit, the measurable area stored in the sensor characteristic storage unit, the orientation of the sensor, and the three-dimensional map.

7. The information collection system according to claim 6, wherein:
the sensor is a tag reader which reads the tag ID stored in the ID tag attached to the object in the room by using radio waves;
the sensor characteristic storage unit stores measurable areas with radio waves of different intensities in association with information indicating the intensities of the radio waves; and
the tag information collection unit is configured to:
cause the sensor to emit radio waves at high radio wave intensity, and instruct the measurement area changing unit to cause the sensor to emit radio waves from a position away from the three-dimensional surface, thereby trying to obtain the tag ID from the ID tag in a wide measurement area of the three-dimensional surface;
instruct, if the sensor fails to obtain the tag ID in said wide measurement area, the measurement area changing unit to cause the sensor to emit radio waves to a wide measurement area of the three-dimensional map outside of said wide measurement area; and
cause, if the sensor obtains the tag ID in said wide measurement area, the sensor to emit radio waves at low radio wave intensity while moving from a position close to the three-dimensional surface along the three-dimensional surface, and to try to acquire the tag ID from the ID tag in a narrower measurement area.

8. The information collection system according to claim 1, wherein:
the information collection instruction unit transmits, when instructed by the user to collect information of the ID tag together with information designating a certain space in the three-dimensional map, the information collection instruction containing the information designating the certain space, to the information collection robot; and
the tag information collection unit moves, upon reception of the information collection instruction from the management server, the information collection robot within the movable range to an area of the two-dimensional map in which the certain space designated by the information collection instruction can be measured by using the moving unit, and then collects information of the ID tag at the moving destination by using the sensor.

9. The information collection system according to claim 1, wherein the management server further includes:
a second three-dimensional map storage unit which stores the three-dimensional map; and
a display unit which arranges the tag ID on a position of the three-dimensional map corresponding to the coordinates stored in the tag information storage unit in association with the tag ID, to display the tag ID.

10. An information collection robot which automatically collects information indicating a position of an ID tag which stores a tag ID to identify the ID tag, comprising:
a first three-dimensional map storage unit which stores a three-dimensional map which is a set of surface coordinates of a three-dimensional environment;
a two-dimensional map storage unit which stores a two-dimensional map which is a set of three-dimensional coordinates at a predetermined height in the three-dimensional map;
a first movable range storage unit which stores a movable range which is information indicating a movable area of the information collection robot in the two-dimensional map;
a moving unit which moves the information collection robot;
a sensor which reads the tag ID stored in the ID tag attached to an object in a room;
a sensor characteristic storage unit which stores a measurable area indicating a three-dimensional area where a radio wave emitted by the sensor reaches;
a localization unit which estimates coordinates of the information collection robot in the two-dimensional map;
a tag information collection unit which moves, upon reception of an information collection instruction to collect ID tag information from the management server, the information collection robot within the movable range in the two-dimensional map by using the moving unit, senses an object surface shown in the three-dimensional map by using the sensor at a moving destination, specifies a surface area of the three-dimensional map that can be sensed by the sensor based on a data acquisition position indicated by coordinates of the information collection robot when the tag ID is obtained from the ID tag, the measurable area stored in the sensor characteristic storage unit, orientation of the sensor, and the three-dimensional map, and transmits first tag information containing coordinates in the specified surface area, the data acquisition position, and the obtained tag ID to the management server;
a moving sequence storage unit which stores a moving sequence where via-positions, as coordinates to be passed through by the information collection robot in the movable range and as coordinates at which coordinates of the ID tag and the tag ID are to be collected by using the sensor, are correlated with information indicating a passing sequence of the information collection robot; and
a moving sequence reception unit which stores, upon reception of the moving sequence from the management server, the received moving sequence in the moving sequence storage unit.

* * * * *